United States Patent
Suzuki

(10) Patent No.: US 12,411,303 B2
(45) Date of Patent: Sep. 9, 2025

(54) LENS HOLDER DRIVING APPARATUS

(71) Applicant: ALPS ALPINE CO., LTD., Tokyo (JP)

(72) Inventor: Katsutoshi Suzuki, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 434 days.

(21) Appl. No.: 17/929,839

(22) Filed: Sep. 6, 2022

(65) Prior Publication Data
US 2023/0071120 A1 Mar. 9, 2023

(30) Foreign Application Priority Data
Sep. 9, 2021 (JP) .................... 2021-147092

(51) Int. Cl.
*G02B 7/04* (2021.01)

(52) U.S. Cl.
CPC ................. *G02B 7/04* (2013.01)

(58) Field of Classification Search
CPC . G02B 7/04; G02B 7/09; G02B 7/102; G02B 7/023; G02B 7/10; G02B 7/02; G02B 7/026; G02B 27/646; G02B 7/021; G02B 7/08; F16C 19/50; F16C 29/04; F16C 2206/00; F16C 2322/39; F16C 29/004; F16C 33/32; F16C 2370/20; G03B 17/14; G03B 17/12; G03B 2205/0046; G03B 2205/0053; G03B 3/10; G03B 5/00; H02K 41/02; H02K 41/0354; H02K 41/0356; H02N 2/026; H02N 2/025; H02N 2/005; H02N 2/04; H10N 30/2046; G11B 7/0908; G11B 7/0925; G11B 7/0927; G11B 7/0929; G11B 7/093; G11B 7/0937

USPC ........ 359/822–824, 694, 696–698, 703–704, 359/813–814, 822–826
See application file for complete search history.

(56) References Cited

U.S. PATENT DOCUMENTS

| | | | |
|---|---|---|---|
| 5,225,941 A * | 7/1993 | Saito | B23Q 1/34 369/44.14 |
| 7,786,648 B2 | 8/2010 | Xu et al. | |
| 2005/0236931 A1 * | 10/2005 | Sakano | G02B 7/102 310/323.17 |

(Continued)

FOREIGN PATENT DOCUMENTS

JP 2006-098580 4/2006

*Primary Examiner* — Thomas K Pham
*Assistant Examiner* — Kuei-Jen L Edenfield
(74) *Attorney, Agent, or Firm* — IPUSA, PLLC

(57) ABSTRACT

A lens holder driving apparatus includes a fixed member; a lens holder configured to hold a lens body; a shaft member provided on the fixed member and extending along an optical axis direction so as to guide the lens holder; a piezoelectric driver including a piezoelectric element and configured to move the lens holder along the optical axis direction by a movement of the piezoelectric element; a receiving member provided on the lens holder; and a preload member provided on the fixed member. The piezoelectric driver is provided on the fixed member. The receiving member is disposed facing the piezoelectric driver so as to contact the piezoelectric driver, and receives the movement of the piezoelectric element. The piezoelectric driver includes a contact member and is configured to be preloaded toward the receiving member by the preload member such that the receiving member contacts the contact member.

15 Claims, 16 Drawing Sheets

(56) References Cited

U.S. PATENT DOCUMENTS

| | | | |
|---|---|---|---|
| 2007/0217775 A1 | 9/2007 | Shirono et al. | |
| 2009/0067070 A1* | 3/2009 | Mitani | G02B 7/02 |
| | | | 359/824 |
| 2010/0209096 A1* | 8/2010 | Buschmann | B60R 11/04 |
| | | | 396/448 |
| 2010/0315730 A1* | 12/2010 | Kakuta | G02B 7/08 |
| | | | 359/824 |
| 2017/0081738 A1* | 3/2017 | Flodstrom | C23C 8/80 |
| 2020/0209439 A1* | 7/2020 | Hu | G02B 3/14 |
| 2022/0210300 A1* | 6/2022 | Seo | H04N 23/51 |

* cited by examiner

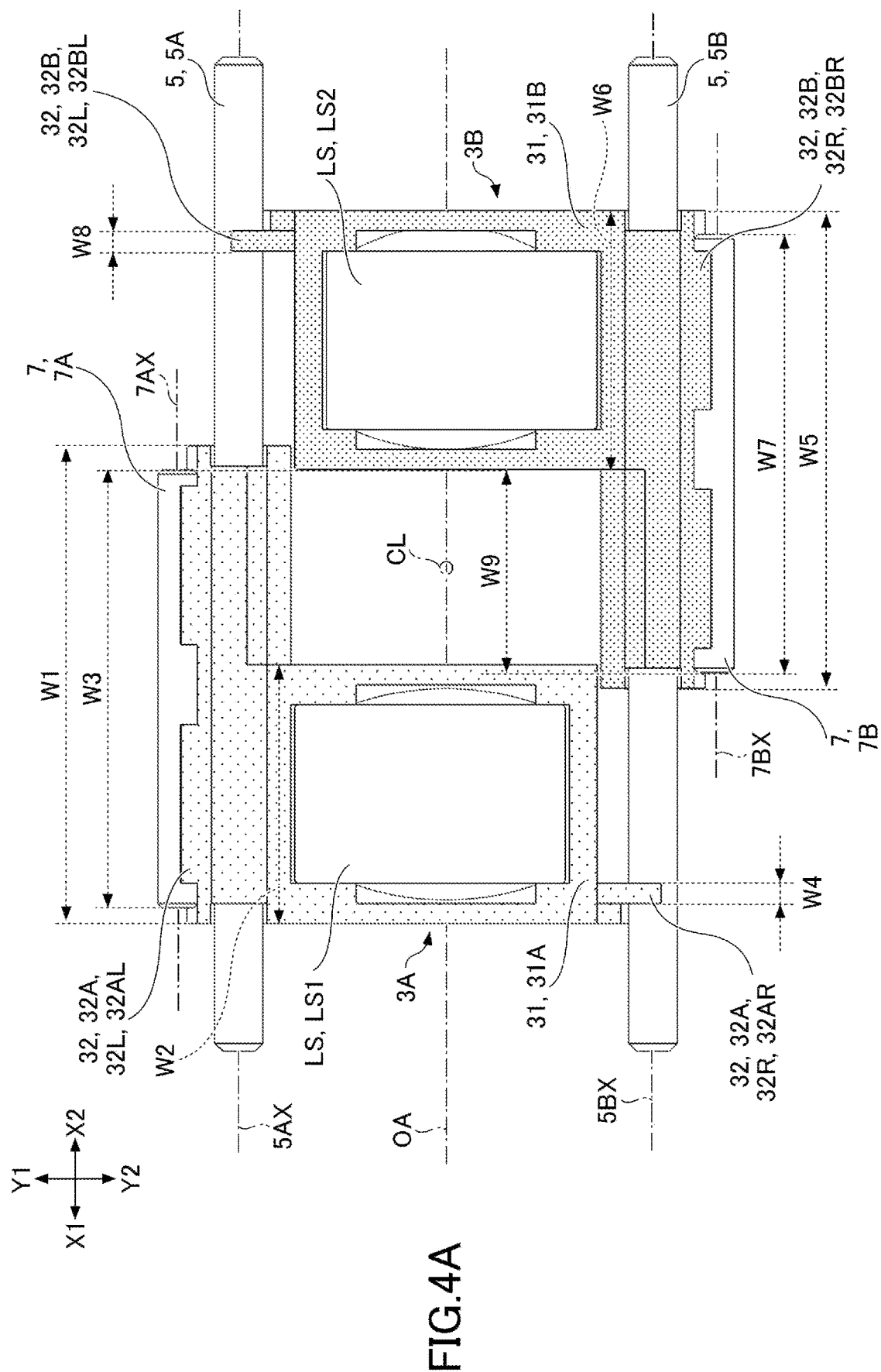

LENS HOLDER DRIVING APPARATUS

CROSS-REFERENCE TO RELATED APPLICATIONS

This application is based on and claims priority to Japanese Patent Application No. 2021-147092, filed on Sep. 9, 2021, the entire contents of which are incorporated herein by reference.

BACKGROUND OF THE INVENTION

1. Field of the Invention

The disclosure herein relates to a lens holder driving apparatus.

2. Description of the Related Art

An apparatus configured to move a lens holder by using a piezoelectric element is known (see Patent Document 1).

However, in the above-described apparatus, the piezoelectric element is attached to the lens holder that serves as a movable member. Therefore, flexible wiring is required to supply power to the piezoelectric element, thus making it difficult to easily assemble the apparatus.

RELATED-ART DOCUMENTS

Patent Documents

Patent Document 1: Japanese Laid-open Patent Publication No. 2006-098580

SUMMARY OF THE INVENTION

It is desirable to provide a lens holder driving apparatus that can be easily assembled.

According to an embodiment of the present invention, a lens holder driving apparatus includes a fixed member; a lens holder configured to hold a lens body; a shaft member that is provided on the fixed member and extends along an optical axis direction so as to guide the lens holder; a piezoelectric driver that includes a piezoelectric element and is configured to move the lens holder along the optical axis direction by a movement of the piezoelectric element, a receiving member that is provided on the lens holder; and a preload member that is provided on the fixed member. The piezoelectric element extends in a first direction that intersects the optical axis direction. The piezoelectric driver is provided on the fixed member. The receiving member faces the piezoelectric driver so as to contact the piezoelectric driver, extends in a second direction that intersects the first direction in which the piezoelectric element extends, and receives the movement of the piezoelectric element. The piezoelectric driver includes a contact member on a surface on a lens holder side of the piezoelectric element, and is configured to be preloaded toward the receiving member by the preload member such that the receiving member contacts the contact member.

BRIEF DESCRIPTION OF THE DRAWINGS

Other objects and further features of the present invention will be apparent from the following detailed description when read in conjunction with the accompanying drawings, in which:

FIG. 4A is a top view of a lens holder supported by a shaft member.

DESCRIPTION OF THE EMBODIMENTS

Figure 1A:
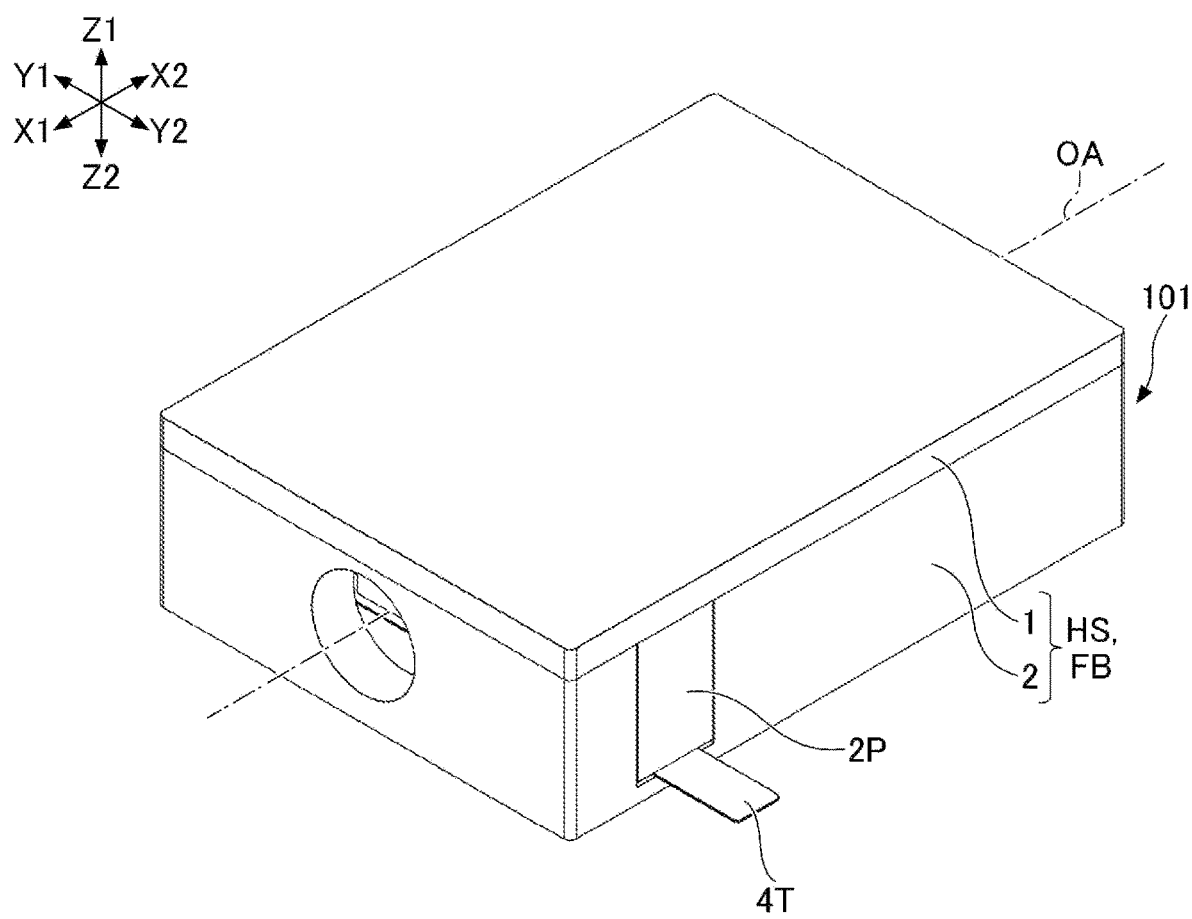
FIG. 1A is a perspective view of a lens holder driving apparatus.
Figure 1B:
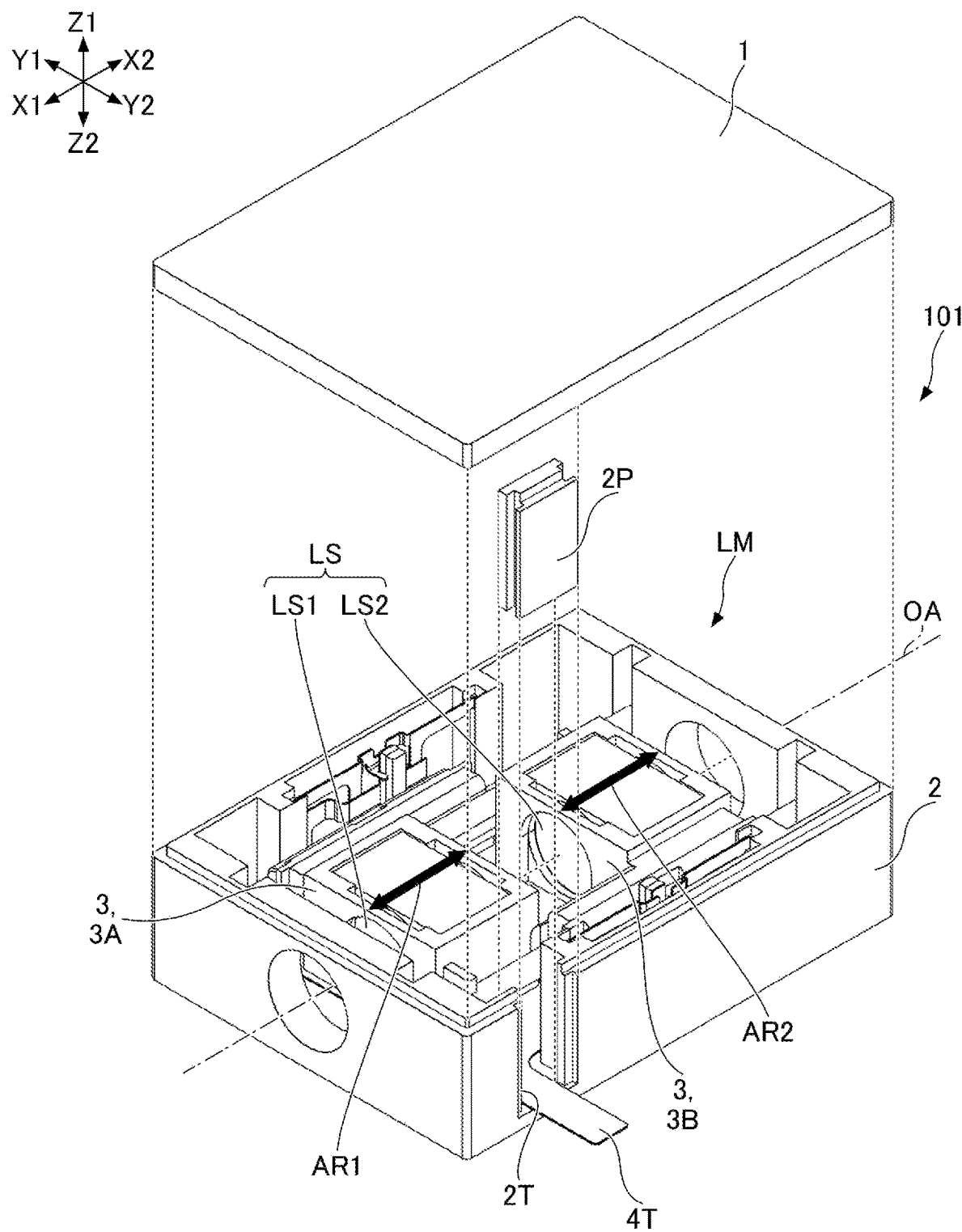
FIG. 1B is an exploded perspective view of the lens holder driving apparatus.
Figure 2:
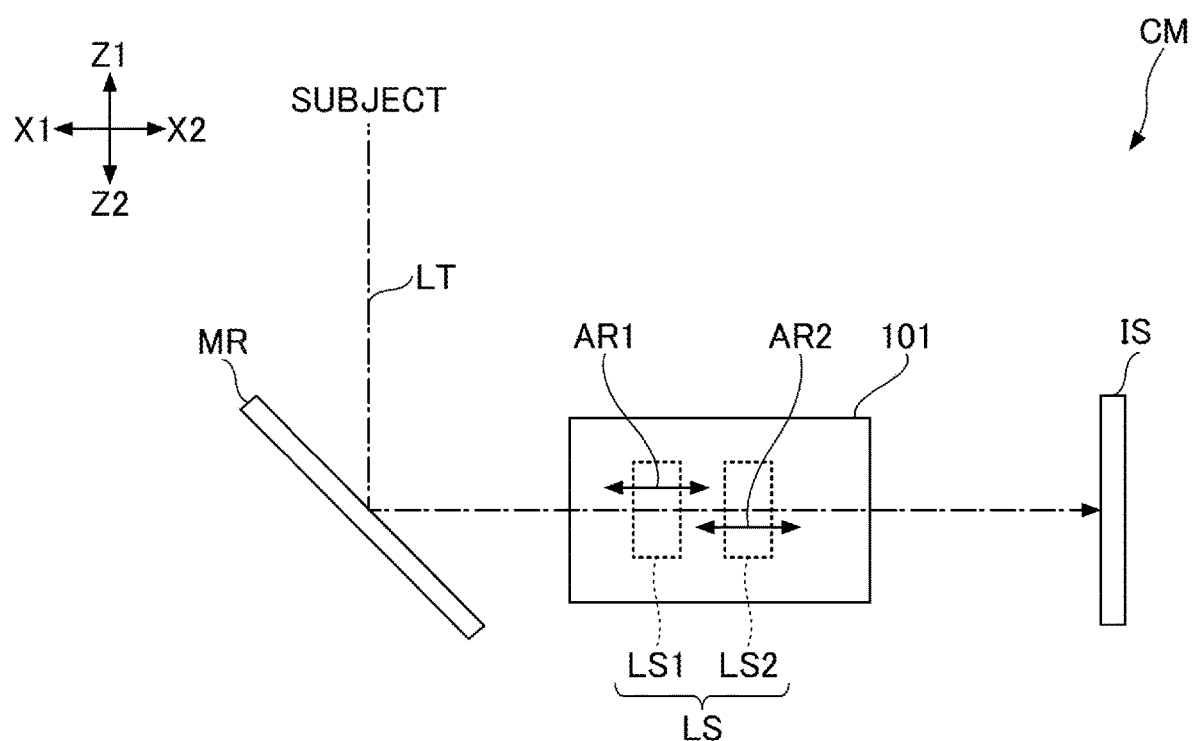
FIG. 2 is a schematic view of a camera module.

In the following, a lens holder driving apparatus 101 according to an embodiment of the present invention will be described with reference to the accompanying drawings. FIG. 1A is a perspective view of the lens holder driving apparatus 101. FIG. 1B is an exploded perspective view of the lens holder driving apparatus 101. FIG. 2 is a schematic view of a camera module CM in a portable device with a camera, in which the lens holder driving apparatus 101 is included.

In the illustrated example, X1 represents one direction of the X axis of the three-dimensional Cartesian coordinate system, and X2 represents the other direction of the X axis. Y1 represents one direction of the Y axis of the three-dimensional Cartesian coordinate system, and Y2 represents the other direction of the Y axis. Similarly, Z1 represents one direction of the Z axis of the three-dimensional Cartesian coordinate system, and Z2 represents the other direction of the Z axis. Further, the X1 side of the lens holder driving apparatus 101 corresponds to the front side (subject side) of the lens holder driving apparatus 101, the X2 side of the lens holder driving apparatus 101 corresponds to the rear side (imaging element side) of the lens holder driving apparatus 101. Further, the Y1 side of the lens holder driving apparatus 101 corresponds to the left side of the lens holder driving apparatus 101, and the Y2 side of the lens holder driving apparatus 101 corresponds to the right side of the lens holder driving apparatus 101. Further, the Z1 side of the lens holder driving apparatus 101 corresponds to the upper side of the lens holder driving apparatus 101, and the Z2 side of the lens holder driving apparatus 101 corresponds to the lower side of the lens holder driving apparatus 101. The same applies to the other drawings.

The lens holder driving apparatus 101 is configured to move a lens body LS along an optical axis OA of the lens body LS.

The lens body LS is an example of an optical member, and includes one or more lenses. Typically, the lens body LS is a cylindrical lens barrel with at least one lens, and the central axis of the lens body LS is configured to extend along the optical axis OA. In the illustrated example, the lens body LS includes a first lens body LS1 constituting a zoom lens and a second lens body LS2 constituting a focus lens. In the illustrated example, the lens body LS includes a first lens body LS1 constituting a zoom lens and a second lens body LS2 constituting a focus lens.

The lens holder driving apparatus 101 is configured to move the lens body LS along an optical axis direction by a piezoelectric driver PD (see FIG. 3) housed in a housing HS. The optical axis direction includes a direction of the optical axis OA of the lens body LS and a direction parallel to the optical axis OA. Specifically, as indicated by a double arrow AR1 in FIG. 1B and FIG. 2, the lens holder driving apparatus 101 can move the first lens body LS1 along the optical axis direction, and as indicated by a double arrow AR2, the lens holder driving apparatus 101 can move the second lens body LS2 along the optical axis direction. That is, the lens holder driving apparatus 101 can separately move the first lens body LS1 and the second lens body LS2 along the optical axis direction.

The housing HS is a part of a fixed member FB, and includes a cover member 1 and a base member 2.

As illustrated in FIG. 2, the lens holder driving apparatus 101 is used in the camera module CM such as a periscope-type camera module. In the example illustrated in FIG. 2, the camera module CM mainly includes a mirror MR, the lens body LS, the lens holder driving apparatus 101, an imaging element IS, and the like. The mirror MR may be a prism. In the example illustrated in FIG. 2, the mirror MR is configured to provide a flat reflective surface.

Typically, as illustrated in FIG. 2, the lens holder driving apparatus 101 is disposed at a position farther from a subject than the mirror MR and is configured to allow light LT, coming from the subject and reflected by the mirror MR, to reach the imaging element IS through the lens body LS.

Figure 3:
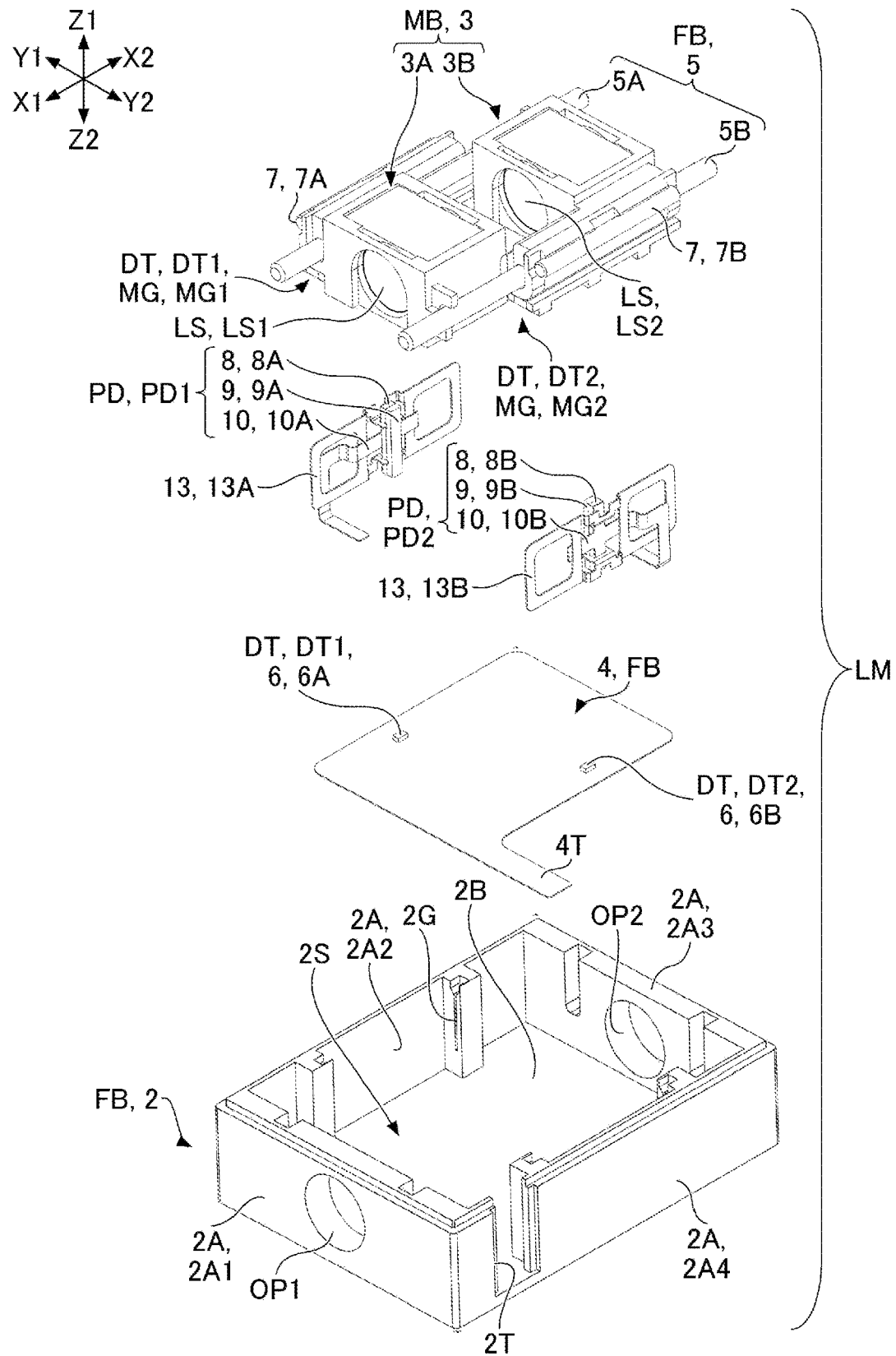
FIG. 3 is an exploded perspective view of a lower member.

Next, referring to FIG. 1B and FIG. 3, an outline of the lens holder driving apparatus 101 will be described. FIG. 1B is an exploded perspective view of the lens holder driving apparatus 101 in which the cover member 1 is separated from a lower member LM. FIG. 3 is an exploded perspective view of the lower member LM. In FIG. 3, a movable member MB is separated from the fixed member FB. The movable member MB is configured to be moved in the optical axis direction by the piezoelectric driver PD.

As illustrated in FIG. 1B, the lens holder driving apparatus 101 includes the cover member 1 and the lower member LM, which are part of the fixed member FB (housing HS). The cover member 1 is configured to cover the lower member LM. In the present embodiment, the cover member 1 is formed of a synthetic resin material.

The base member 2 is a member constituting a part of the housing HS. In present embodiment, the base member 2 is formed of a synthetic resin material, similar to the cover member 1.

Specifically, as illustrated in FIG. 3, the base member 2 has a bottomed box-like outer shape that defines a housing portion 2S. The base member 2 has an outer wall portion 2A having a substantially rectangular cylindrical shape and a bottom surface portion 2B having a substantially rectangular flat shape. The bottom surface portion 2B continues to the lower end (Z2 side end) of the outer wall portion 2A. The outer wall portion 2A includes a first side plate portion 2A1, a second side plate portion 2A2, a third side plate portion 2A3, and a fourth side plate portion 2A4. The first side plate portion 2A1 and the third side plate portion 2A3 face each other, and the second side plate portion 2A2 and the fourth side plate portion 2A4 face each other. Further, the second side plate portion 2A2 and the fourth side plate portion 2A4 are perpendicular to the first side plate portion 2A1 and the third side plate portion 2A3. In other words, the first side plate portion 2A1 and the third side plate portion 2A3 are perpendicular to the second side plate portion 2A2 and the fourth side plate portion 2A4. The first side plate portion 2A1 has a circular through hole OP1 for receiving the light LT coming from the subjected and reflected by the mirror MR. Similarly, the third side plate portion 2A3 has a circular through hole OP2 for allowing the light LT to reach the imaging element IS. The cover member 1 is bonded to the base member 2 with an adhesive or the like, and constitutes the housing HS together with the base member 2.

As illustrated in FIG. 3, a notch 2T, through which a terminal portion 4T of a substrate 4 passes, is formed in the fourth side plate portion 2A4 of the base member 2. As illustrated in FIG. 1A and FIG. 1B, the base member 2 includes a plug member 2P for closing the notch 2T. In the illustrated example, the plug member 2P is fitted into the notch 2T and fixed with an adhesive. Note that the plug member 2P is not depicted in FIG. 3 for clarity.

As illustrated in FIG. 3, the lower member LM includes a lens holder 3, which is an example of the movable member MB. The lower member LM further includes the base member 2, the substrate 4, a shaft member 5, and the piezoelectric driver PD which are an example of the fixed member FB.

The lens holder 3 is configured to hold the lens body LS. In the illustrated example, the lens holder 3 is formed by performing injection molding on a synthetic resin such as a liquid crystal polymer (LCP). Further, the lens holder 3 includes a first lens holder 3A configured to hold the first lens body LS1 and a second lens holder 3B configured to hold the second lens body LS2. Note that the first lens holder 3A and the second lens holder 3B have the same shape and the same size. Therefore, the first lens holder 3A and the second lens holder 3B can be formed of the same material, thus reducing the cost.

Figure 4B:
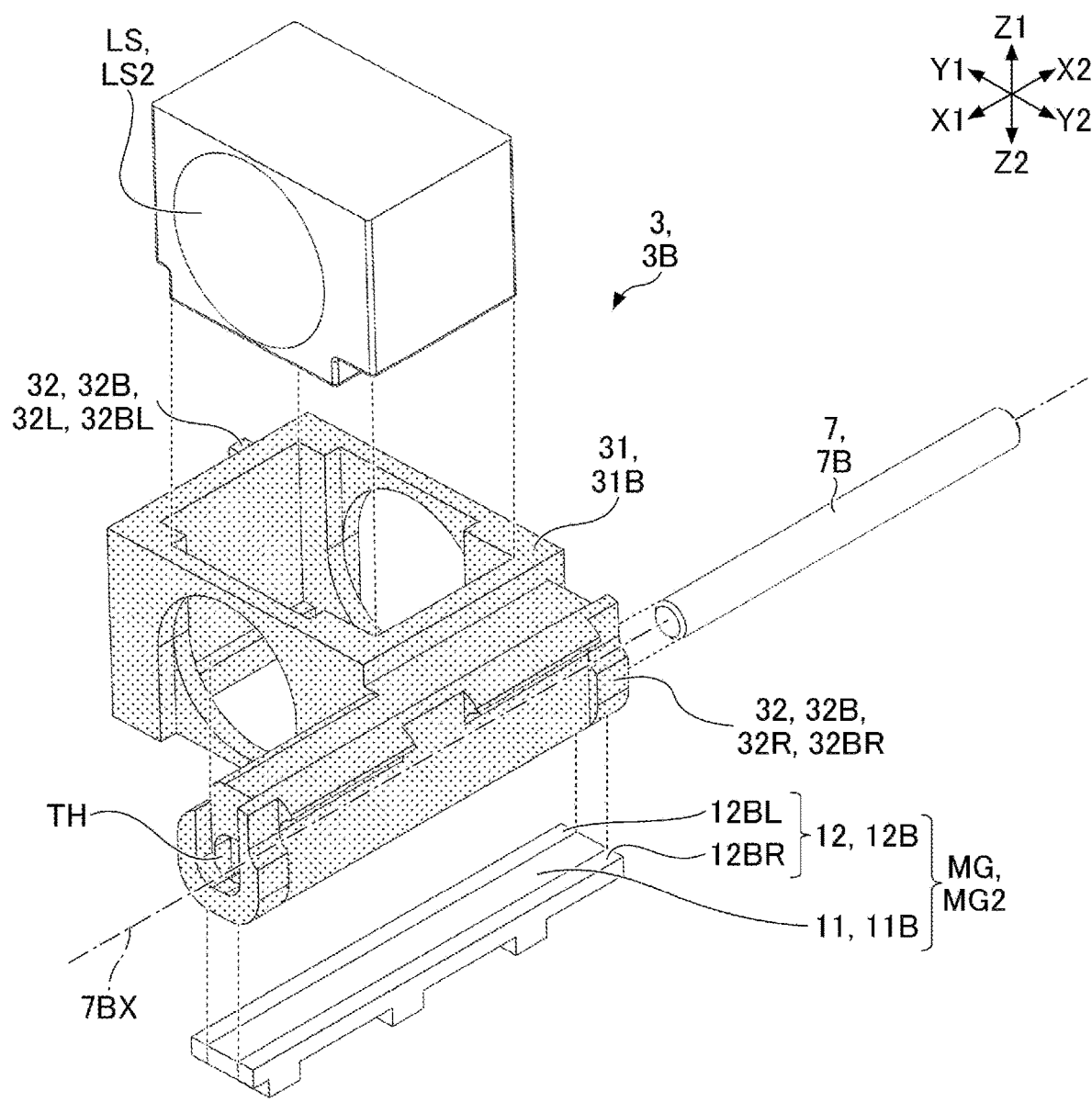
FIG. 4B is an exploded perspective view of the lens holder.

Next, the lens holder 3 will be described in detail with reference to FIG. 4A and FIG. 4B. FIG. 4A is a top view of the lens holder 3 supported by the shaft member 5. FIG. 4B is an exploded perspective view of the second lens holder 3B. The description with reference to FIG. 4B relates to the second lens holder 3B, but also applies analogously to the first lens holder 3A. In FIG. 4A, the first lens holder 3A is indicated by a coarse dot pattern, and the second lens holder 3B is indicated by a fine dot pattern for clarity. In FIG. 4B, the second lens holder 3B is indicated by a fine dot pattern for clarity.

The shaft member 5 includes a first shaft member 5A having an axis (axis 5AX) parallel to the optical axis OA and a second shaft member 5B having an axis (axis 5BX) parallel to the optical axis OA. Therefore, the first shaft member 5A and the second shaft member 5B extend in the optical axis direction while being parallel to each other. In the illustrated example, the shaft member 5 is configured such that one end of the shaft member 5 is fitted into a groove formed in the first side plate portion 2A1 of the base member 2 and the other end of the shaft member 5 is fitted into a groove formed in the third side plate portion 2A3 of the base member 2. However, the shaft member 5 may be configured such that one end of the shaft member 5 is inserted into a circular through hole (not illustrated) formed in the first side plate portion 2A1 of the base member 2 and the other end of the shaft member 5 is inserted into a circular through hole (not illustrated) formed in the third side plate portion 2A3 of the base member 2. The shaft member 5 may be fixed to the base member 2 with an adhesive.

As illustrated in FIG. 4A and FIG. 4B, the lens holder 3 includes a holding portion 31 that holds the lens body LS, and a shaft-receiving portion 32 that receives the shaft member 5. The shaft-receiving portion 32 includes a left shaft-receiving portion 32L that receives the first shaft member 5A, and a right shaft-receiving portion 32R that receives the second shaft member 5B. The shaft-receiving portion 32 functions as a rotation stopper that stops the rotation of the lens holder 3 around the shaft member 5.

Specifically, the first lens holder 3A includes a first holding portion 31A that holds the first lens body LS1, and a first shaft-receiving portion 32A that receives the shaft member 5. The first shaft-receiving portion 32A includes the left shaft-receiving portion 32L (first left shaft-receiving portion 32AL) that receives the first shaft member 5A, and the right shaft-receiving portion 32R (a first right shaft-receiving portion 32AR) that receives the second shaft member 5B.

Similarly, the second lens holder 3B includes a second holding portion 31B that holds the second lens body LS2, and a second shaft-receiving portion 32B that receives the shaft member 5. The second shaft-receiving portion 32B includes the left shaft-receiving portion 32L (second left shaft-receiving portion 32BL) that receives the first shaft member 5A, and the right shaft-receiving portion 32R (a second right shaft-receiving portion 32BR) that receives the second shaft member 5B.

More specifically, as illustrated in FIG. 4B, the second right shaft-receiving portion 32BR has a circular through hole TH capable of receiving the second shaft member 5B. The same applies to the first left shaft-receiving portion 32AL.

Figure 10:
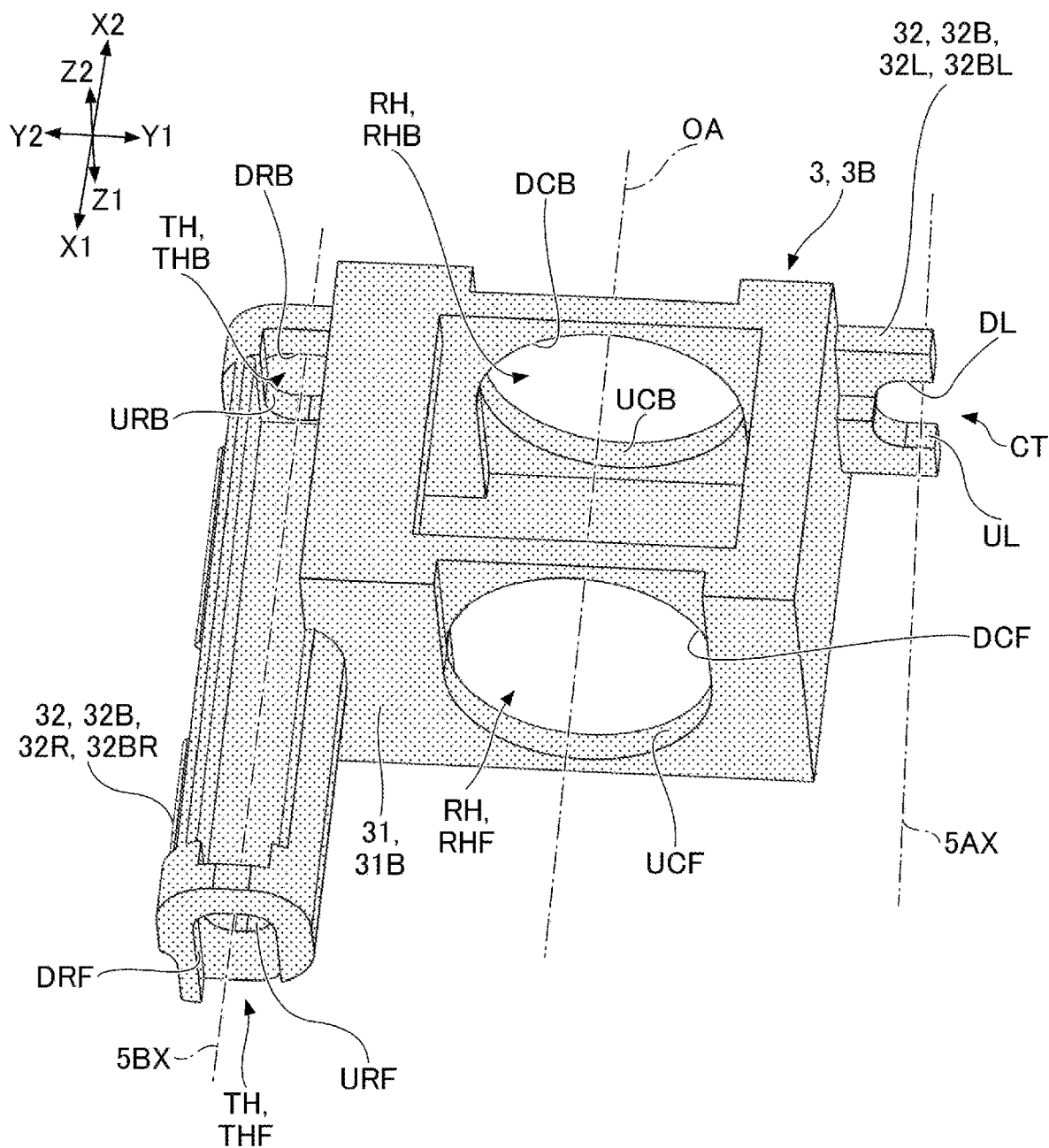
FIG. 10 is a bottom perspective view of the lens holder.

As illustrated in FIG. 10, the second left shaft-receiving portion 32BL has a notch CT that opens to the left (in the Y1 direction) and that is capable of receiving the first shaft member 5A. The same applies to the first right shaft-receiving portion 32AR.

A receiving member 7 is fixed to one of the two shaft-receiving portions 32 of each of the first lens holder 3A and the second lens holder 3B. The receiving member 7 is a member disposed in contact with a contact member 9 (see FIG. 3) of piezoelectric driver PD. The receiving member 7 includes a first receiving member 7A having an axis 7AX parallel to the optical axis OA, and a second receiving member 7B having an axis 7BX parallel to the optical axis OA.

In the illustrated example, the receiving member 7 is formed of a material different from that of the lens holder 3, and has a rod shape (substantially cylindrical shape). Specifically, the lens holder 3 is formed of a liquid crystal polymer (LCP), and the receiving member 7 is formed of a metal. However, the receiving member 7 may be a part of the lens holder 3. In this case, the receiving member 7 may be formed of the same material as that of the lens holder 3, and may be integrated with the lens holder 3. Further, the receiving member 7 may have any other shape such as an elliptical column shape or a rectangular column shape. Alternatively, the receiving member 7 may have a plate shape.

In the example illustrated in FIG. 4A and FIG. 4B, the first receiving member 7A is fixed to the first left shaft-receiving portion 32AL of the first lens holder 3A, and the second receiving member 7B is fixed to the second right shaft-receiving portion 32BR of the second lens holder 3B. That is, in the example illustrated in FIG. 4A, the first lens holder 3A and the second lens holder 3B are disposed to have twofold rotational symmetry with respect to a center line CL (a line parallel to the Z axis) of the lens holder driving apparatus 101.

Further, the shaft-receiving portion 32, to which the receiving member 7 is fixed, is formed such that the length of the shaft-receiving portion 32 in the optical axis direction is greater than that of the holding portion 31. In the example illustrated in FIG. 4A, the first left shaft-receiving portion 32AL, to which the first receiving member 7A is fixed, is formed such that the width W1, which is a dimension in the optical axis direction, of the first left shaft-receiving portion 32AL is greater than the width W2 of the first holding portion 31A and greater than the width W3 of the first receiving member 7A.

Conversely, the first right shaft-receiving portion 32AR is formed such that its width W4 is smaller than the width W2 of the first holding portion 31A. The first right shaft-receiving portion 32AR is formed at a front end portion (an end portion on the X1 side) of the first holding portion 31A, such that the first right shaft-receiving portion 32AR and the second right shaft-receiving portion 32BR do not make contact with each other when the first lens holder 3A and the second lens holder 3B approach each other.

Similarly, the right shaft-receiving portion 32BR, to which the second receiving member 7B is fixed, is formed such that its width W5 is greater than the width W6 of the second holding portion 31B and greater than the width W7 of the second receiving member 7B.

Conversely, the second left shaft-receiving portion 32BL is formed such that its width W8 is smaller than the width W6 of the second holding portion 31B. The second left shaft-receiving portion 32BL is formed at a rear end portion (an end portion on the X2 side) of the second holding portion 31B, such that the first left shaft-receiving portion 32AL and the second left shaft-receiving portion 32BL do make contact with each other when the first lens holder 3A and the second lens holder 3B approach each other.

With the above-described configuration, the first lens holder 3A and the second lens holder 3B may be disposed, such that at least a part of the first left shaft-receiving portion 32AL and a part of the second right shaft-receiving portion 32BR overlap in the y-axis direction in a state in which the first holding portion 31A and the second holding portion 31B are in proximity to each other. In the state illustrated in FIG. 4A, the first left shaft-receiving portion 32AL of the first lens holder 3A and the second right shaft-receiving portion 32BR of the second lens holder 3B are partially at the same position in the optical axis direction. Accordingly, the first receiving member 7A and the second receiving member 7B overlap over the width W9 in the y-axis direction.

Accordingly, one effect of the above-described configuration is that the first lens body LS1 and the second lens body LS2 can approach each other to the extent that the first lens body LS1 and the second lens body LS2 are nearly in contact with each other, while the width W1 of the first left shaft-receiving portion 32AL is set to be greater than the width W2 of the first holding portion 31A and the width W5 of the second right shaft-receiving portion 32BR is set to be greater than the width W6 of the second holding portion 31B.

In the illustrated example, the first lens holder 3A and the second lens holder 3B are configured to have the same size and the same shape. Therefore, the width W1 is equal to the width W5, the width W2 is equal to the width W6, the width W3 is equal to the width W7, and the width W4 is equal to the width W8. However, the width W1 may be different from the width W5, the width W2 may be different from the width W6, the width W3 may be different from the width W7, and the width W4 may be different from the width W8.

Figure 5A:
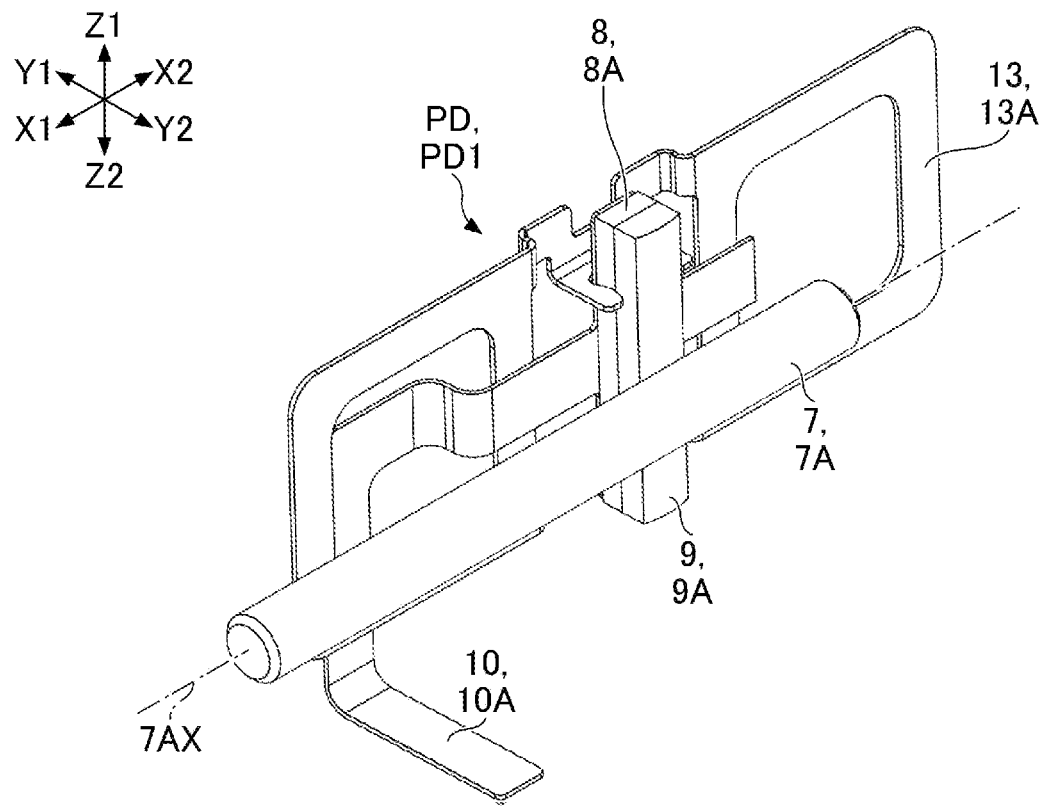
FIG. 5A is a perspective view of a piezoelectric driver pressed against a receiving member by a preload member.
Figure 5B:
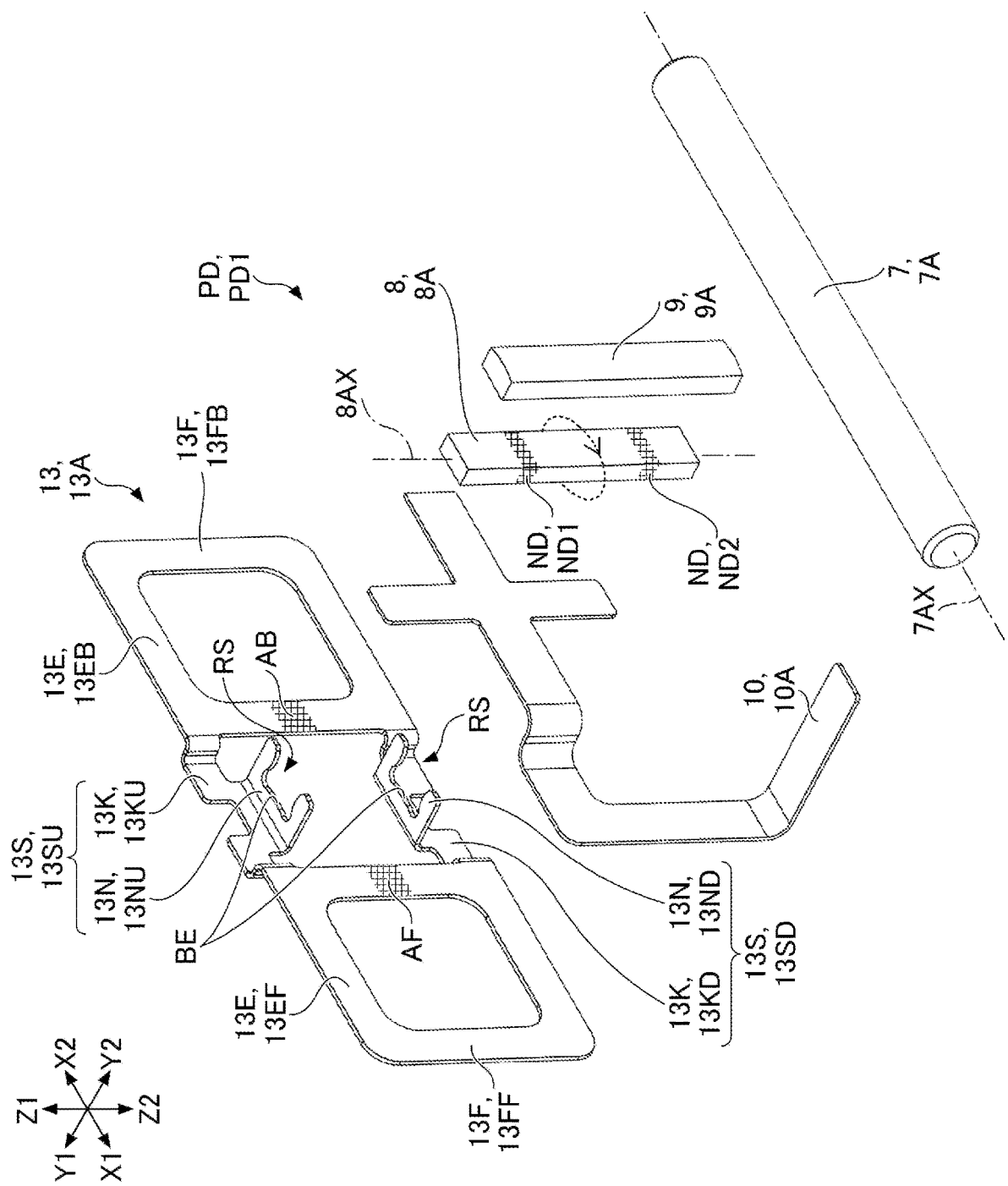
FIG. 5B is an exploded perspective view of the piezoelectric driver pressed against the receiving member by the preload member.
Figure 6:
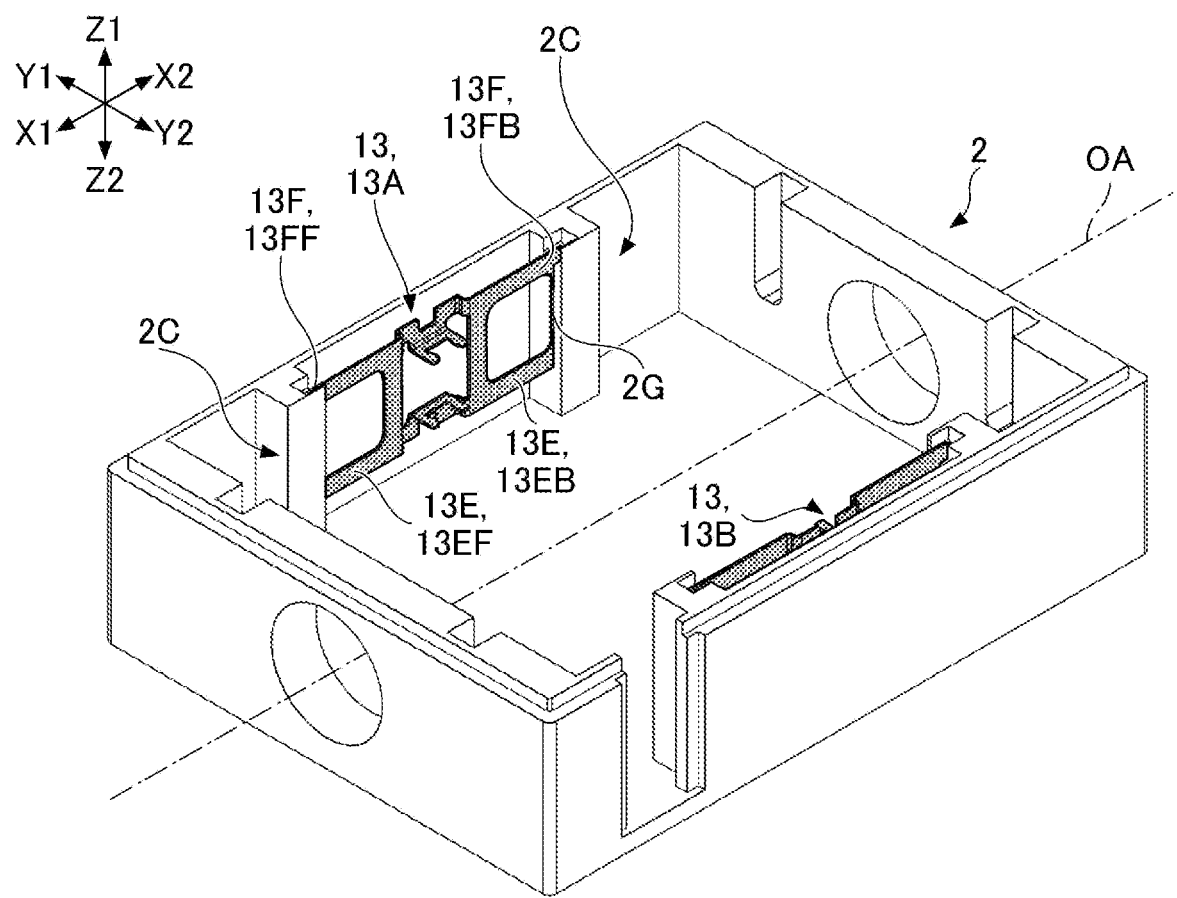
FIG. 6 is a perspective view of the preload member attached to a base member.

Next, the piezoelectric driver PD will be described with reference to FIG. 5A, FIG. 5B, and FIG. 6. FIG. 5A is a perspective view of the piezoelectric driver PD pressed against the receiving member 7 by a preload member 13. FIG. 5B is an exploded perspective view of the piezoelectric driver PD pressed against the receiving member 7 by the preload member 13. FIG. 6 is a perspective view of the preload member 13 attached to the base member 2. In FIG. 6, the preload member 13 is indicated by a dot pattern for clarity.

The piezoelectric driver PD is configured to move the lens holder 3 along the optical axis direction. In the present embodiment, the piezoelectric driver PD is an example of a frictional driving unit that uses a driving system as described in U.S. Pat. No. 7,786,648. The piezoelectric driver PD includes a piezoelectric element 8, the contact member 9, and a circuit board 10.

The piezoelectric driver PD is configured to be preloaded inward (toward the optical axis OA) by the preload member 13, which is fixed to the base member 2, and to be pressed against the receiving member 7. In the illustrated example, the preload member 13 is formed of a metal plate, and is configured so as to contact the outer surface (on the side far from the optical axis OA) of the piezoelectric element 8 through the circuit board 10, at a position (an inner edge portion BE) corresponding to each of two nodes ND (see FIG. 5B) of flexural vibration (a circular motion as will be described later) of the piezoelectric element 8. The preload member 13 is bonded to the piezoelectric driver PD with an adhesive, for example.

As illustrated in FIG. 3, the piezoelectric driver PD includes a first piezoelectric driver PD1 configured to move the first lens holder 3A along the optical axis direction, and a second piezoelectric driver PD2 configured to move the second lens holder 3B along the optical axis direction. The first piezoelectric driver PD1 includes a first piezoelectric element 8A, a first contact member 9A, and a first circuit board 10A. The second piezoelectric driver PD2 includes a second piezoelectric element 8B, a second contact member 9B, and a second circuit board 10B.

The preload member 13 includes a first preload member 13A disposed to press the first piezoelectric driver PD1 against the first receiving member 7A, and a second preload member 13B disposed to press the second piezoelectric driver PD2 against the second receiving member 7B.

In FIG. 5A and FIG. 5B, the first piezoelectric driver PD1 pressed against the first receiving member 7A by the first preload member 13A is depicted. However, the following description with reference to FIG. 5A and FIG. 5B also applies analogously to the second piezoelectric driver PD2 pressed against the second receiving member 7B by the second preload member 13B. This is because the first piezoelectric driver PD1 and the second piezoelectric driver PD2 have the same configuration.

In the illustrated example, the first piezoelectric element 8A extends in the Z axis direction perpendicular to the optical axis direction (the X-axis direction) (that is, the direction perpendicular to the optical axis OA), and is configured to generate a flexural vibration (circular motion) having two nodes ND. Specifically, the first piezoelectric element 8A has a two-layer structure including a first layer for generating a first flexural vibration in the XZ plane and a second layer for generating a second flexural vibration in the YZ plane. The first piezoelectric driver PD1 applies a voltage to the a piezoelectric element constituting the first layer and a voltage to a piezoelectric element constituting the second layer individually at appropriate timings, so that a locus drawn by the center point of the first piezoelectric element 8A becomes a circular orbit around a rotation axis 8AX. That is, the first piezoelectric element 8A can generate a movement (circular motion) such that the center point of the first piezoelectric element 8A draws a circle. In the example illustrated in FIG. 5B, the rotation axis 8AX is parallel to the Z axis. By applying the voltages at appropriate timings, the first piezoelectric driver PD1 can switch the moving direction (rotational direction) of the center point, following the circular orbit, between the clockwise direction and the counterclockwise direction as viewed from the Z1 side. Note that the circle (circular orbit) drawn by the center point of the first piezoelectric element 8A is not necessarily a perfect circle, and may be an approximate circle.

In FIG. 5B, a dotted arrow drawn around the first piezoelectric element 8A indicates the flexural vibration (circular motion) of the first piezoelectric element 8A (that is, the first piezoelectric element 8A rotates in the clockwise direction around the rotation axis 8AX while deflecting). In this case, the first receiving member 7A (first lens holder 3A) that contacts the first contact member 9A of the first piezoelectric driver PD1 including the first piezoelectric element 8A moves forward (in the X1 direction). Although not illustrated, the first piezoelectric element 8A can also rotate in the counterclockwise direction around the rotation axis 8AX while deflecting. In this case, the first receiving member 7A (the first lens holder 3A) that contacts the first contact member 9A moves rearward (in the X2 direction).

That is, the first lens holder 3A (first receiving member 7A) moves forward (in the X1 direction) when the rotational direction of the center point of the first piezoelectric element 8A is clockwise, and moves rearward (in the X2 direction) when the rotational direction of the center point of the first piezoelectric element 8A is counterclockwise. The center point of the first piezoelectric element 8A is a point at which the amplitude of the first flexural vibration is maximum (a point corresponding to an antinode of the first flexural vibration) and is also a point at which the amplitude of the second flexural vibration is maximum (a point corresponding to an antinode of the second flexural vibration).

The first contact member 9A is attached to the first piezoelectric element 8A, and is configured to contact the first receiving member 7A. In the illustrated example, the first contact member 9A is bonded to the surface on the inner side (on the Y2 side that faces the optical axis OA) of the first piezoelectric element 8A with an adhesive so as to cover the entire surface on the inner side of the first piezoelectric element 8A. The first contact member 9A is formed of a metal such as stainless steel. The first contact member 9A has an appropriate thickness such that a flexural vibration (circular motion) can be performed in response to the flexural vibration (circular motion) of the first piezoelectric element 8A. In the illustrated example, the first contact member 9A is a friction plate formed of stainless steel. The first contact member 9A extends in the Z-axis direction that is the extending direction of the first piezoelectric element 8A. The first contact member 9A is configured such that a center portion in the extending direction of the first contact member 9A contacts the first receiving member 7A attached to the first lens holder 3A. Specifically, the first contact member 9A is configured to contact the first receiving member 7A at a position where the amplitude of the flexural vibration (circular motion) is maximum (a position corresponding to an antinode of the flexural vibration). Further, the surface on a side in contact with the first receiving member 7A (that is, the surface on the Y2 side) of the first contact member 9A has a curved shape (an arc shape). The first receiving member 7A is formed of a metal such as stainless steel. In the illustrated example, the first receiving member 7A is a rod member formed of stainless steel, having a cylindrical shape, and extending in the optical axis direction. In order to prevent abrasion of the first lens holder 3A made of a synthetic resin due to contact with the first contact member 9A made of a metal, the first contact member 9A made of a metal contacts the first receiving member 7A made of a metal. Note that the length of the first contact member 9A in the Z-axis direction may be different from the length of the first piezoelectric element 8A, as long as the first contact member 9A contacts the first receiving member 7A.

The first circuit board 10A is a board that includes a conductive pattern, and is configured to electrically connect an external power source to the first piezoelectric element 8A. In the illustrated example, the first circuit board 10A is a flexible printed circuit board having flexibility. One end of the first circuit board 10A is connected to the substrate 4, and the first circuit board 10A is configured to apply a voltage to the first piezoelectric element 8A. The first piezoelectric element 8A is bonded to the surface on the inner side (on the Y2 side that faces the optical axis OA) of the first circuit board 10A with an anisotropic conductive adhesive. The first piezoelectric element 8A may be bonded to the surface on the inner side of the first circuit substrate 10A with an anisotropic conductive adhesive film.

In the illustrated example, the preload member 13 is a leaf spring member. Specifically, as illustrated in FIG. 5B, the first preload member 13A includes a fixed portion 13F that is fixed to the base member 2, a support portion 13S that supports the first piezoelectric driver PD1, and an elastically deformable portion 13E that is elastically deformable and provided between the fixed portion 13F and the support portion 13S. Further, in the preload member 13, the fixed portion 13F is fixed to the base member 2 such that the support portion 13S and the elastically deformable portion 13E do not contact the base member 2. The following description with reference to FIG. 5B relates to the first preload member 13A, but also applies analogously to the second preload member 13B. This is because the second preload member 13 B has the same shape and the same size as those of the first preload member 13A.

Specifically, the fixed portion 13F includes a front fixed portion 13FF and a rear fixed portion 13FB. The support portion 13S includes an upper support portion 13SU and a lower support portion 13SD. The elastically deformable portion 13E includes a front elastically deformable portion 13EF provided between the front fixed portion 13FF and the upper support portion 13SU, and a rear elastically deformable portion 13EB provided between the rear fixed portion 13FB and the upper support portion 13SU. The front fixed portion 13FF and the rear fixed portion 13FB have the same shape and the same size. The upper support portion 13SU and the lower support portion 13SD have the same shape and the same size. The front elastically deformable portion 13EF and the rear elastically deformable portion 13EB have the same shape and the same size. That is, the first preload member 13A is configured to be symmetric with respect to a symmetry plane parallel to the YZ plane (plane that divides the first preload member 13A into two front and rear portions). The first preload member 13A is also configured to be symmetric with respect to another symmetry plane parallel to the XY plane (plane that divides the first preload member 13A into two upper and lower portions). The same applies to the second preload member 13B.

In the illustrated example, the front elastically deformable portion 13EF is connected to the front fixed portion 13FF through a pair of upper and lower elastic arm portions. However, the front elastically deformable portion 13EF may be connected to the front fixed portion 13FF through one elastic arm portion or three or more elastic arm portions. Further, although the elastic arm portions are configured to extend linearly along the optical axis direction, the elastic arm portions may have any shape such as a shape including a curved portion. The same applies to the rear elastically deformable portion 13EB. In the illustrated example, the front fixed portion 13FF is configured such that the ends of the front fixed portion 13FF are connected to the respective upper and lower elastic arm portions of the front elastically deformable portion 13EF. However, the ends of the front fixed portion 13FF are not necessarily connected to the respective upper and lower elastic arm portions. That is, the front fixed portion 13FF may be configured by two or more separate portions. The same applies to the rear fixed portion 13FB.

The support portion 13S includes a base portion 13K and a bent portion 13N. The base portion 13K is connected to the elastically deformable portion 13E, and the bent portion 13N is bent in an L-shape from the base portion 13K and protrudes toward the lens holder 3 (toward the Y2 side). Further, a recess RS is formed in the tip of the bent portion 13N. The recess RS is a recess that opens toward the lens holder 3 (toward the Y2 side). Specifically, the base portion 13K includes an upper base portion 13KU, which is a part of the upper support portion 13SU, and a lower base portion 13KD, which is a part of the lower support portion 13SD. The bent portion 13N includes an upper bent portion 13NU, which is a part of the upper support portion 13SU, and a lower bent portion 13ND, which is a part of the lower support portion 13SD. Recesses RS are formed in the tips of the upper bent portion 13NU and the lower bent portion 13ND, and have the same shape and the same size. As illustrated in FIG. 5A, a part of the first piezoelectric driver PD1 is disposed in a recess RS, and is fixed to the bent portion 13N with an adhesive while contacting the inner edge portion BE of the recess RS.

More specifically, as illustrated in FIG. 5B, the recess RS has a front edge portion and a rear edge portion that face each other across the inner edge portion BE. Further, as illustrated in FIG. 5A, the first piezoelectric driver PD1 is disposed between the front edge portion and the rear edge portion.

A position at the first piezoelectric driver PD1 contacts the inner edge portion BE of the recess RS corresponds to the position of each of the nodes ND of the first piezoelectric element 8A that generates the flexural vibration. The position of each of the nodes ND includes the position of a first node ND1 and the position of a second node ND2. In FIG. 5B, the position of each of the nodes ND is indicated by a cross pattern for clarity.

The position at which the first piezoelectric driver PD1 contacts the inner edge portion BE of the recess RS (that is, the position of each of the nodes ND) corresponds to a position a predetermined distance from an end portion of the first piezoelectric driver PD1. The predetermined distance is, for example, approximately one quarter of the total length of the piezoelectric driver PD.

The first piezoelectric driver PD1 is fixed to the bent portion 13N with an adhesive. Specifically, the first piezoelectric driver PD1 (first circuit board 10A) is fixed to the inner edge portion BE of the recess RS of the bent portion 13N with an adhesive. Further, the first circuit board 10A of the first piezoelectric driver PD1 is fixed to a contact portion AF of the front elastically deformable portion 13EF and to a contact portion AB of the rear elastically deformable portion 13EB of the first preload member 13A with an adhesive. In the illustrated example, an ultraviolet curable adhesive is used; however, any other adhesive such as a moisture curable adhesive or a thermosetting adhesive may be used.

As illustrated in FIG. 5B, the elastically deformable portion 13E extends away from the base portion 13K. Specifically, the front elastically deformable portion 13EF extends forward (in the X1 direction) from the upper base portion 13KU and the lower base portion 13KD, and the rear side elastically deformable portion 13EB extends rearward (in the X2 direction) from the upper base portion 13KU and the lower base portion 13KD. The extending direction of the elastically deformable portion 13E is parallel to the optical axis direction.

The fixed portion 13F is provided on an extension line of the elastically deformable portion 13E. As illustrated in FIG. 6, the fixed portion 13F is held by a holding portion 2C provided on the base member 2. Specifically, the holding portion 2C has a groove 2G into which the fixed portion 13F is fitted. In the illustrated example, the fixed portion 13F of the preload member 13 is held by the holding portion 2C by being fitted into the groove 2G of the holding portion 2C from above. Note that the fixed portion 13F may be held by the holding portion 2C with an adhesive, or the fixed portion 13F held by the holding portion 2C may be reinforced with an adhesive.

Figure 7:
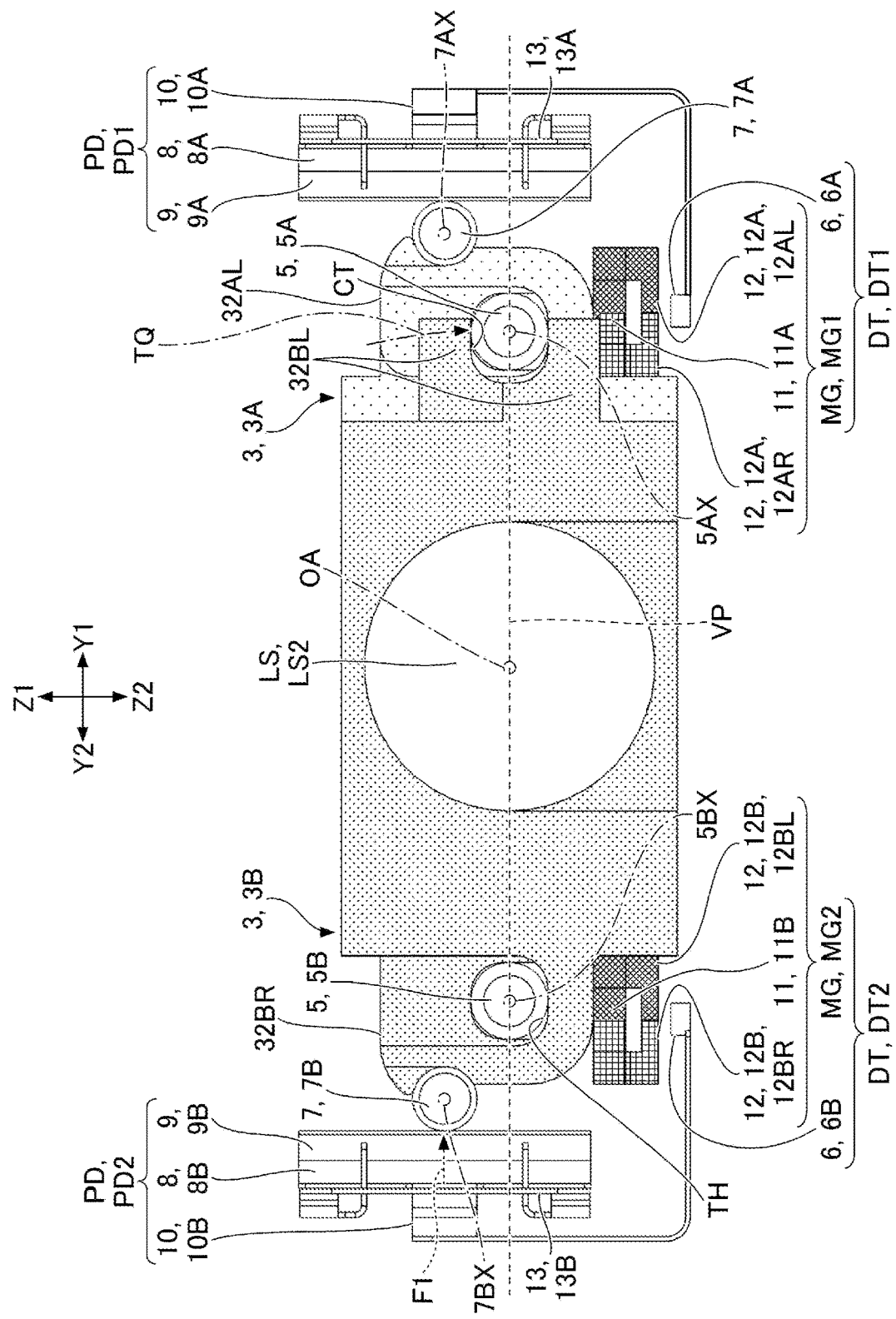
FIG. 7 is a rear view of a structure housed in a housing.

Next, a position detection mechanism DT will be described with reference to FIG. 7. FIG. 7 is a rear view of a structure housed in the housing HS that includes the cover member 1 and the base member 2. The structure housed in the housing HS includes the position detection mechanism DT, the lens body LS, the piezoelectric driver PD, the lens holder 3, the substrate 4, and the preload member 13. In FIG. 7, for clarity, the substrate 4 is not depicted, and the first lens holder 3A is indicated by a coarse dot pattern and the second lens holder 3B is indicated by a fine dot pattern.

The position detection mechanism DT is a mechanism for detecting the position of the lens holder 3. The position detection mechanism DT includes a magnetic sensor 6 and a magnetic field generating member MG. The magnetic field generating member MG includes a magnet 11 and a magnetic member 12.

The magnetic sensor 6 is configured to detect a magnetic field generated by the magnetic field generating member MG. In the illustrated example, the magnetic sensor 6 is configured by a giant magnetoresistance (GMR) element. The magnetic sensor 6 is configured to measure a voltage value, which changes according to the magnitude of a magnetic field generated by the magnetic field generating member MG and is received by the magnetic sensor 6, and to detect the position of the lens holder 3 to which the magnetic field generating member MG is attached. Further, the magnetic sensor 6 is configured to output a larger voltage value as an N-pole portion approaches and output a smaller voltage value as an S-pole portion approaches. However, the magnetic sensor 6 may be configured to output a smaller voltage value as an N-pole portion approaches and output a larger voltage value as an S-pole portion approaches. The magnetic sensor 6 may be configured to use any other magnetoresistive element, such as a semiconductor magnetoresistive (SMR) element, an anisotropic magnetoresistive (AMR) element, or a tunnel magnetoresistive (TMR) element, to detect the position of the lens holder 3, or may be configured to use a Hall element to detect the position of the lens holder 3.

In the illustrated example, the position detection mechanism DT includes a first position detection mechanism DT1 for detecting the position of the first lens holder 3A, and a second position detection mechanism DT2 for detecting the position of the second lens holder 3B. The first position detection mechanism DT1 includes a first magnetic sensor 6A and a first magnetic field generating member MG1. The second position detection mechanism DT2 includes a second magnetic sensor 6B and a second magnetic field generating member MG2. The first magnetic field generating member MG1 includes a first magnet 11A and a first magnetic member 12A. The second magnetic field generating member MG2 includes a second magnet 11B and a second magnetic member 12B. The first magnetic member 12A includes a first left magnetic member 12AL and a first right magnetic member 12AR. The second magnetic member 12B includes a second left magnetic member 12BL and a second right magnetic member 12BR.

Figure 8A:
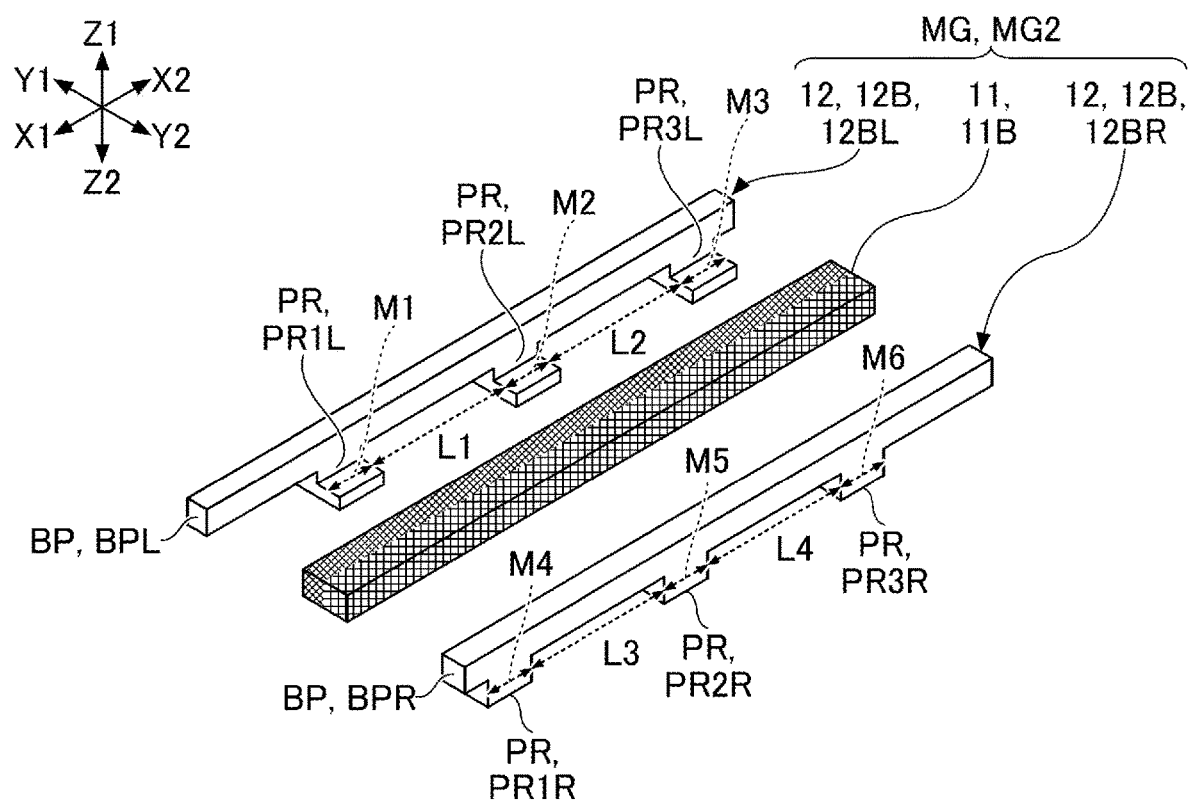
FIG. 8A is a top perspective view of a magnetic field generating member before a magnetic member is attached to a magnet.
Figure 8B:
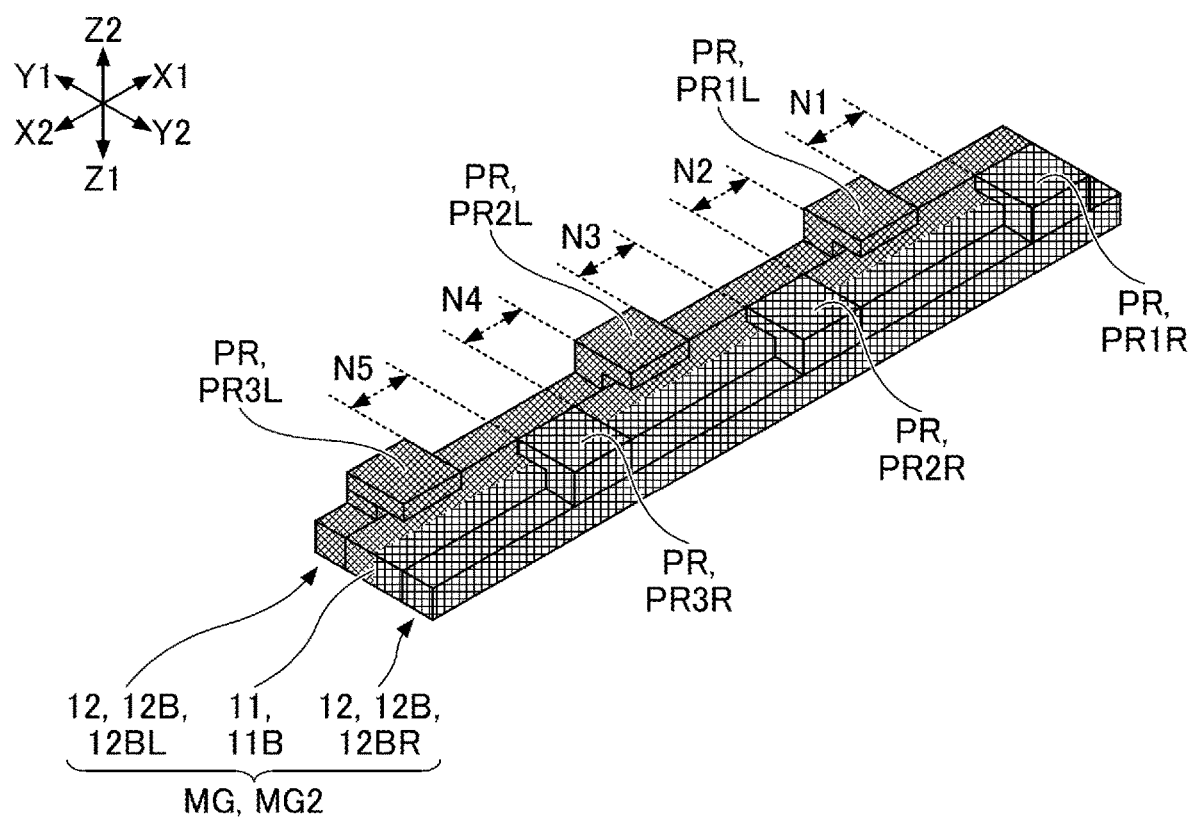
FIG. 8B is a bottom perspective view of the magnetic field generating member after the magnetic member is attached to the magnet.
Figure 8C:
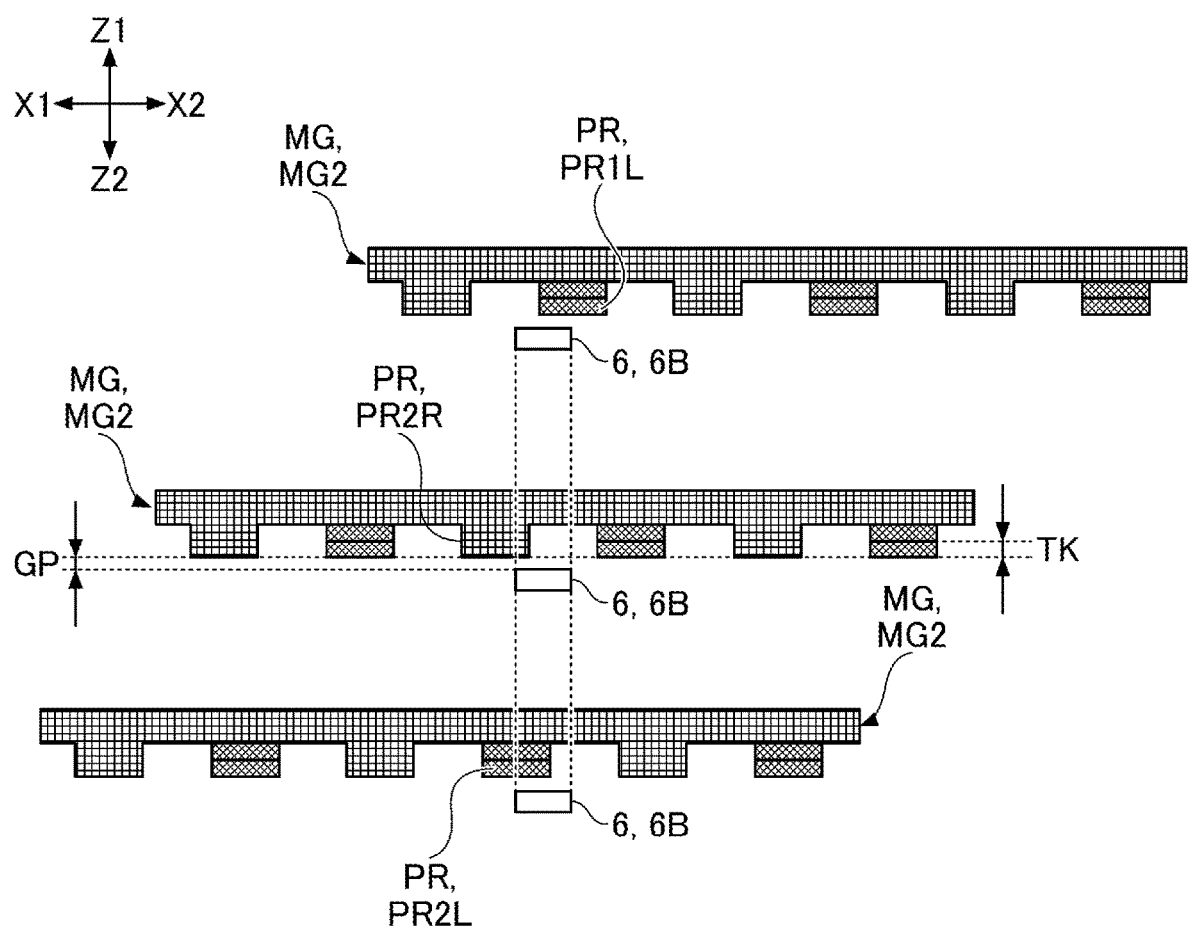
FIG. 8C is a right side view of a magnetic sensor and the magnetic field generating member.
Figure 8D:
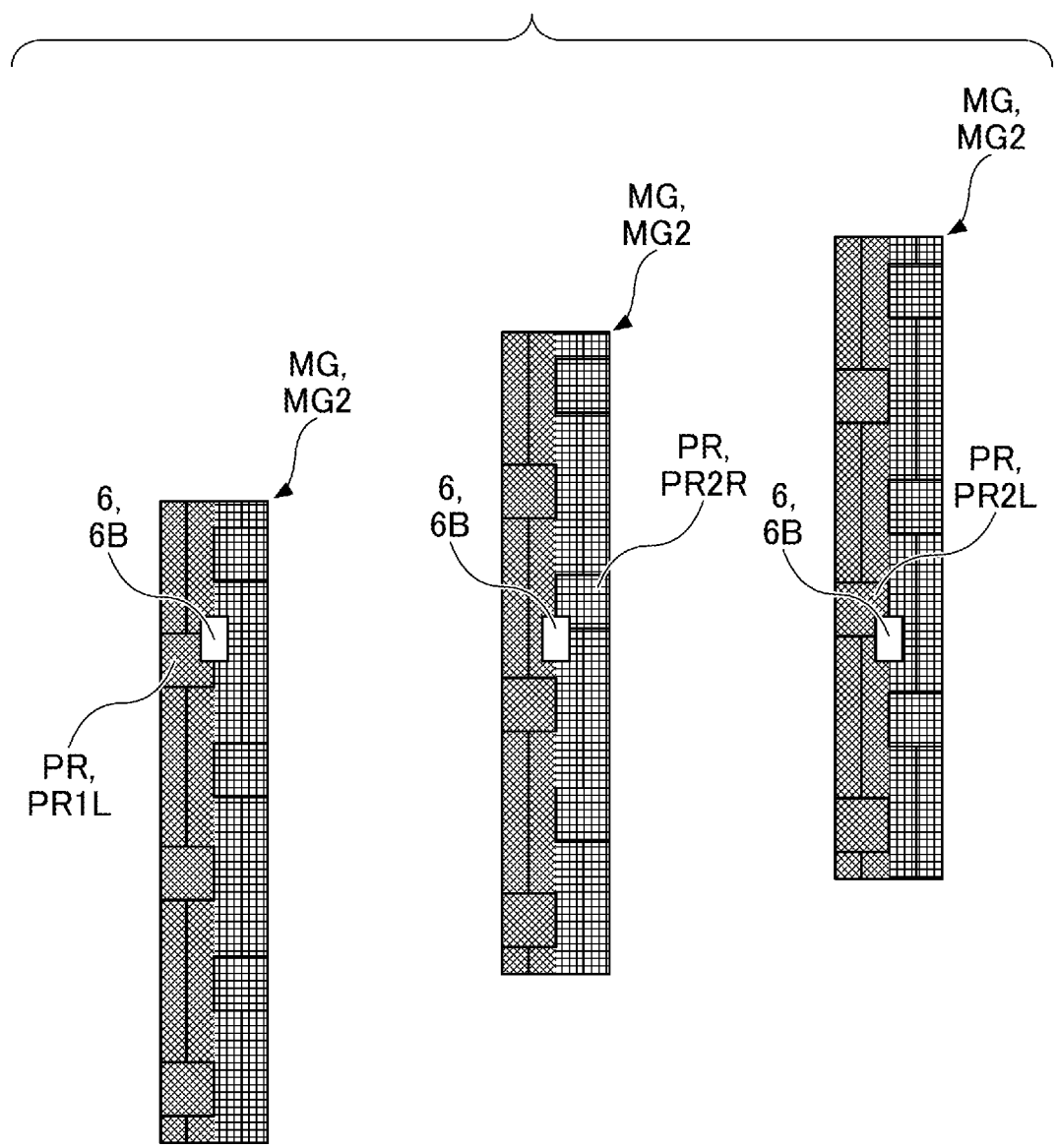
FIG. 8D is a bottom view of the magnetic sensor and the magnetic field generating member.

The magnetic field generating member MG will be described in detail with reference to FIG. 8A through FIG. 8D. FIG. 8A is a top perspective view of the magnetic field generating member MG before the magnetic member 12 is attached to the magnet 11. FIG. 8B is a bottom perspective view of the magnetic field generating member MG after the magnetic member 12 is attached to the magnet 11. FIG. 8C and FIG. 8D illustrate the positional relationship between the magnetic sensor 6 and the magnetic field generating member MG, which changes as the lens holder 3 moves in the optical axis direction. Specifically, FIG. 8C is a right side view of the magnetic sensor 6 and the magnetic field generating member MG, and FIG. 8D is a bottom view of the magnetic sensor 6 and the magnetic field generating member MG. FIG. 8A through FIG. 8D relate to the second magnetic field generating member MG2 that is attached to the lower surface of the second right shaft-receiving portion 32BR of the second lens holder 3B. In the illustrated example, the second magnetic field generating member MG2 is fixed to the lower surface of the second right shaft-receiving portion 32BR of the second lens holder 3B with an adhesive. The following description with reference to FIG. 8A through FIG. 8D also applies analogously to the first magnetic field generating member MG1 that is attached to the lower surface of the first left shaft-receiving portion 32AL of the first lens holder 3A.

As illustrated in FIG. 8A, the second magnetic field generating member MG2 includes the second magnet 11B, the second left magnetic member 12BL, and the second right magnetic member 12BR.

The second magnet 11B is a permanent magnet magnetized to two poles in the Y-axis direction, which is a direction perpendicular to the optical axis direction. In the illustrated example, the second magnet 11B is magnetized such that one end portion (a left end portion) in the direction (Y-axis direction) perpendicular to the optical axis direction becomes an N-pole and the other end portion (a right end portion) becomes an S-pole. In FIG. 8A, for clarity, the N-pole portion of the second magnet 11B is indicated by a fine cross pattern, and the S-pole portion of the second magnet 11B is indicated by a coarse cross pattern.

In FIG. 8B, the second left magnetic member 12BL and the second right magnetic member 12BR are both connected to the second magnet 11B. In the illustrated example, the second left magnetic member 12BL and the second right magnetic member 12BR are fixed to the second magnet 11B with an adhesive.

Specifically, the second left magnetic member 12BL is connected to the N-pole portion, which is the one end portion (left end portion) of the second magnet 11B, and is magnetized to the N-pole, and the second right magnetic member 12BR is connected to the S-pole portion, which is the other end portion (right end portion) of the second magnet 11B, and is magnetized to the S-pole. Therefore, in FIG. 8B, similar to the N-pole portion of the second magnet 11B, the second left magnetic member 12BL is indicated by a fine cross pattern, and, similar to the S-pole portion of the second magnet 11B, the second right magnetic member 12BR is indicated by a rough cross pattern. The same applies to FIG. 8C and FIG. 8D. Note that, in the state illustrated in FIG. 8A, the second left magnetic member 12BL and the second right magnetic member 12BR are not indicated by cross patterns because the second left magnetic member 12BL and the second right magnetic member 12BR are not connected to the second magnet 11B and are not magnetized.

In the illustrated Example, as illustrated in FIG. 8A, the second magnetic member 12B includes a rod portion BP and a protruding portion PR having a L-shape. The protruding portion PR protrudes downward (in the Z2 direction) from the rod portion BP, and subsequently protrudes inward. Specifically, the second left magnetic member 12BL includes a left rod portion BPL and three protruding portions PR (first to third left protruding portions PR1L to PR3L). The three protruding portions PR (first to third left protruding portions PR1L to PR3L) protrude downward from the left rod portion BPL, and subsequently protrude toward the second magnet 11B (in the Y2 direction). Further, the second right magnetic member 12BR includes a right rod portion BPR and three protruding portions PR (first to third right protruding portions PR1R to PR3R). The three protruding portions PR (first to third right protruding portions PR1R to PR3R) protrude downward from the 1 right rod portion BPR, and subsequently protrude toward the second magnet 11B (in the Y1 direction).

In the illustrated Example, the second left magnetic member 12BL is configured such that the height, which is a dimension in the Z-axis direction, of the left rod portion BPL, is the same as the height of the second magnet 11B. However, the height of the left rod portion BPL may be greater than the height of the second magnet 11B. In this case, the second left magnetic member 12BL may be connected to the second magnet 11B such that the upper end surface of the left rod portion BPL is coplanar with the upper end surface of the second magnet 11B. Further, each of the three protruding portions PR may be configured to protrude toward the second magnet 11B (in the Y2 direction) from a portion, of the left rod portion BPL, that protrudes downward (in the Z2 direction) relative to the lower end surface of the second magnet 11B. The same applies to the second right magnetic member 12BR. Alternatively, the second left magnetic member 12BL having such a shape may be connected to the second magnet 11B such that the upper end surface of the left rod portion BPL contacts the lower end surface of the second magnet 11B. In this case, the width, which is a dimension in the Y-axis direction, of the second magnet 11B may be increased. The same applies to the second right magnetic member 12BR.

Further, in the illustrated Example, the second left magnetic member 12BL and the second right magnetic member 12BR are configured, such that the first to third left protruding portions PR1L to PR3L and the first to third right protruding portions PR1R to PR3R are alternately arranged in the extending direction (X-axis direction) of the second magnetic field generating member MG2.

Specifically, as illustrated in FIG. 8B, the second left magnetic member 12BL and the second right magnetic member 12BR are configured such that the first right protruding portion PR1R is disposed on the frontmost side (X1 side) in the extending direction (X-axis direction) of the second magnetic field generating member MG2, the first left protruding portion PR1L is disposed rearward (at the X2 side) of the first right protruding portion PR1R, the second right protruding portion PR2R is disposed rearward (at the X2 side) of the first left protruding portion PR1L, the second left protruding portion PR2L is disposed rearward (at the X2 side) of the second right protruding portion PR2R, the third right protruding portion PR3R is disposed rearward (at the X2 side) of the second left protruding portion PR2L, and the third left protruding portion PR3L is disposed rearward (at the X2 side) of the third right protruding portion PR3R.

Further, as illustrated in FIG. 8A, the second left magnetic member 12BL and the second right magnetic member 12BR are configured such that the width M1 of the first left protruding portion PR1L, the width M2 of the second left protruding portion PR2L, the width M3 of the third left protruding portion PR3L, the width M4 of the first right protruding portion PR1R, the width M5 of the second right protruding portion PR2R, and the width M6 of the third right protruding portion PR3R in the extending direction (X-axis direction) of the second magnetic field generating member MG2 are the same.

Further, as illustrated in FIG. 8A, the second left magnetic member 12BL and the second right magnetic member 12BR are configured, such that the distance L1 between the first left protruding portion PR1L and the second left protruding portion PR2L, the distance L2 between the second left protruding portion PR2L and the third left protruding portion PR3L, the distance L3 between the first right protruding portion PR1R and the second right protruding portion PR2R, and the distance L4 between the second right protruding portion PR2R and the third right protruding portion PR3R in the extending direction (X-axis direction) of the second magnetic field generating member MG2 are the same.

Further, as illustrated in FIG. 8B, the second left magnetic member 12BL and the second right magnetic member 12BR are configured such that the distance N1 between the first right protruding portion PR1R and the first left protruding portion PR1L, the distance N2 between the first left protruding portion PR1L and the second right protruding portion PR2R, the distance N3 between the second right protruding portion PR2R and the second left protruding portion PR2L, the distance N4 between the second left protruding portion PR2L and the third right protruding portion PR3R, and the distance N5 between the third right protruding portion PR3R and the third left protruding portion PR3L in the extending direction (X-axis direction) of the second magnetic field generating member MG2 are the same.

Further, as illustrated in FIG. 8C, the second left magnetic member 12BL and the second right magnetic member 12BR are configured such that the thicknesses TK of portions, protruding toward the second magnet 11B, of the first to third left protruding portions PR1L to PR3L and of the first to third right protruding portions PR1R to PR3R are the same.

Further, as illustrated in FIG. 8C, the second left magnetic member 12BL and the second right magnetic member 12BR are configured, such that the distances GP between the magnetic sensor 6 (second magnetic sensor 6B), fixed to the substrate 4 (not illustrated), and the lower end surfaces (on the Z2 side) of the first to third left protruding portions PR1L to PR3L and of the first to third right protruding portions PR1R to PR3R are the same.

However, the second left magnetic member 12BL and the second right magnetic member 12BR may have different widths M1 to M6. The same applies to the distances L1 to L4, and the same applies to the distances N1 to N5. The second left magnetic member 12BL and the second right magnetic member 12BR may be configured such that the thicknesses TK of the portions, protruding toward the second magnet 11B, of the first to third left protruding portions PR1L to PR3L and of the first to third right protruding portions PR1R to PR3R are different. The same applies to the distances GP.

The middle part of each of FIG. 8C and FIG. 8D illustrates the positional relationship between the second magnetic field generating member MG2 and the second magnetic sensor 6B when the second lens holder 3B is located at a reference position illustrated in FIG. 1B. Each of the upper part of FIG. 8C and the left part of FIG. 8D illustrates the positional relationship between the second magnetic field generating member MG2 and the second magnetic sensor 6B when the second lens holder 3B is moved rearward (in the X2 direction) from the reference position. Each of the lower part of FIG. 8C and the right part of FIG. 8D illustrates the positional relationship between the second magnetic field generating member MG2 and the second magnetic sensor 6B when the second lens holder 3B is moved forward (in the X1 direction) from the reference position.

The second magnetic sensor 6B is provided on the substrate 4 fixed to the base member 2 so as to detect a magnetic field generated by each of the first to third left protruding portions PR1L to PR3L and of the first to third right protruding portions PR1R to PR3R.

When the second lens holder 3B is located at the reference position, the second magnetic sensor 6B partially faces the second right protruding portion PR2R of the second right magnetic member 12BR, which is the S-pole portion, as illustrated in the middle part of each of FIG. 8C and FIG. 8D.

When the second lens holder 3B is moved rearward (in the X2 direction) from the reference position, the second magnetic sensor 6B is moved away from the second right protruding portion PR2R of the second right magnetic member 12BR, which is the S-pole portion, and partially faces the first left protruding portion PR1L of the second left magnetic member 12BL, which is the N-pole portion, as illustrated in the upper part of FIG. 8C and the left part of FIG. 8D.

When the second lens holder 3B is moved forward (in the X1 direction) from the reference position, the second magnetic sensor 6B is moved away from the second right protruding portion PR2R of the second right magnetic member 12BR, which is the S-pole portion, and partially faces the second left protruding portion PR2L of the second left magnetic member 12BL, which is the N-pole portion, as illustrated in the lower part of FIG. 8C and the right part of FIG. 8D.

By utilizing the above-described position detection mechanism DT, a controller (not illustrated), connected to the second magnetic sensor 6B via a conductive pattern formed on the substrate 4, can detect the position of the second lens holder 3B based on a voltage value output from the second magnetic sensor 6B. In the illustrated example, the controller is provided outside the housing HS, but may be provided within the housing HS.

In the illustrated example, the magnetic field generating member MG is configured by the single bipolar permanent magnet. However, the magnetic field generating member MG may be configured by a combination of a plurality of bipolar permanent magnets, may be configured by one multipolar permanent magnet, or may be configured by a combination of a plurality of multipolar permanent magnets.

Figure 9:
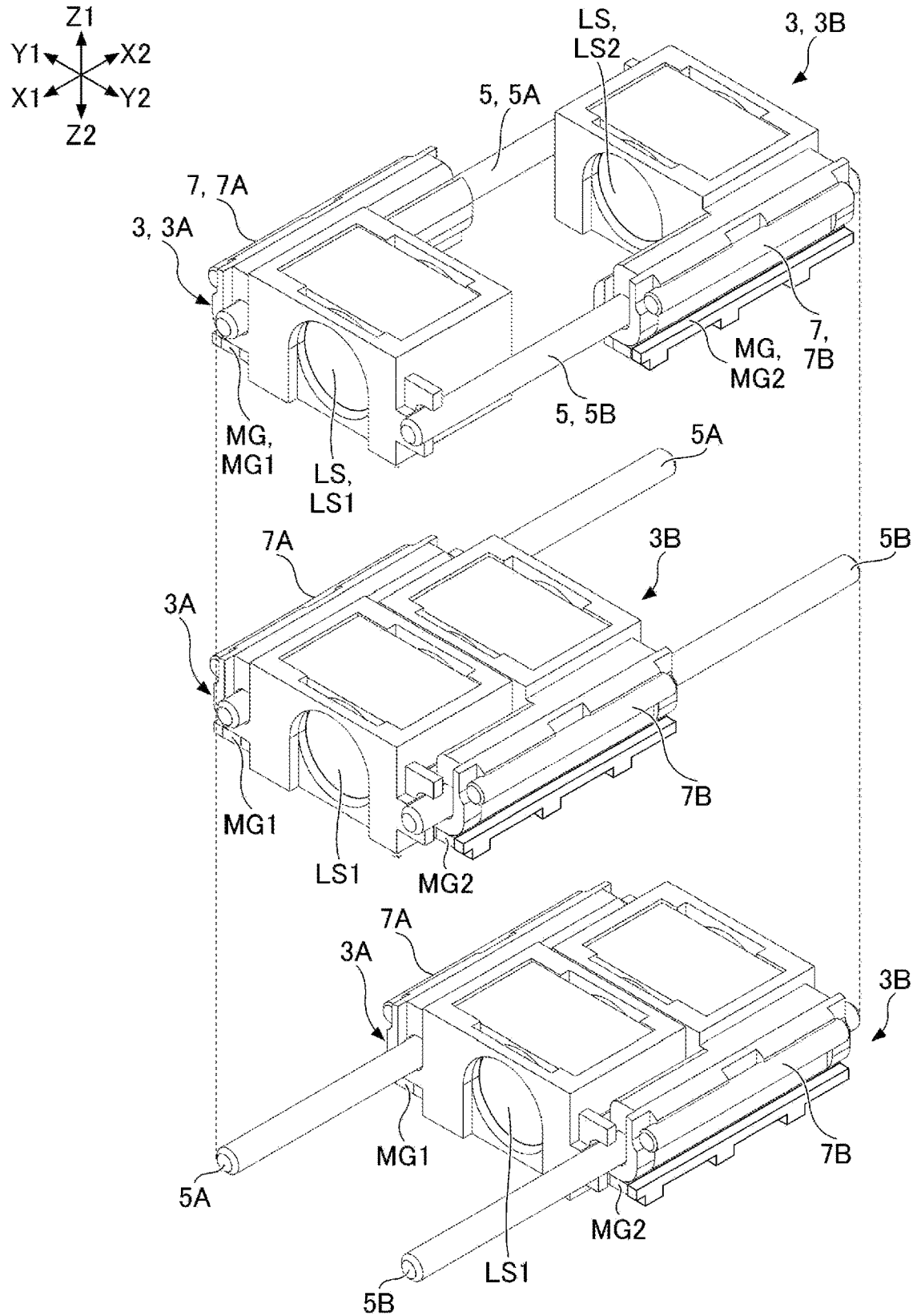
FIG. 9 is a perspective view of the lens holder, the shaft member, the receiving member, a lens body, and the magnetic field generating member.

Next, the movement of the lens holder 3 will be described with reference to FIG. 9. FIG. 9 is a perspective view of the lens holder 3, the shaft member 5, the receiving member 7, the lens body LS, and the magnetic field generating member MG. Specifically, the upper part of FIG. 9 illustrates the positional relationship between the members (the lens holder 3, the shaft member 5, the receiving member 7, the lens body LS, and the magnetic field generating member MG) when the first lens holder 3A is moved to the frontmost side (the X1 side) and the second lens holder 3B is moved to the rearmost side (the X2 side). The middle part of FIG. 9 illustrates the positional relationship between the members when the first lens holder 3A is moved to the frontmost side (the X1 side) and the second lens holder 3B is also moved to the frontmost side (the X1 side). The lower part of FIG. 9 illustrates the positional relationship between the members when the first lens holder 3A is moved to the rearmost side (the X2 side) and the second lens holder 3B is also moved to the rearmost side (the X2 side).

As illustrated in FIG. 9, the lens holder driving apparatus 101 can separately move the first lens holder 3A and the second lens holder 3B along the optical axis direction.

Next, the lens holder 3 will be described in detail with reference to FIG. 10. FIG. 10 is a bottom perspective view of the lens holder 3. The description with reference to FIG. 10 relates to the second lens holder 3B, but also applies analogously to the first lens holder 3A.

As described above, the second lens holder 3B includes the second holding portion 31B, the second left shaft-receiving portion 32BL, and the second right shaft-receiving portion 32BR.

The second holding portion 31B has a circular through hole RH through which the optical axis OA passes. The circular through hole RH includes a front circular through hole RHF and a rear circular through hole RHB. In the illustrated example, the front circular through hole RHF is configured by a combination of a U-shaped groove DCF that opens upward (in the Z1 direction) and a U-shaped groove UCF that opens downward (in the Z2 direction). Specifically, the U-shaped groove DCF and the U-shaped groove UCF are disposed adjacent to each other in the front-rear direction (X-axis direction) and disposed facing each other in the upper-lower direction. Similarly, the rear circular through hole RHB is configured by a combination of a U-shaped groove DCB that opens upward (in the Z1 direction) and a U-shaped groove UCB that opens downward (in the Z2 direction). Specifically, the U-shaped groove DCB and the U-shaped groove UCB are disposed adjacent to each other in the front-rear direction (X-axis direction) and disposed facing each other in the upper-lower direction (Z-axis direction).

Further, the second right shaft-receiving portion 32BR has a circular through hole TH through which the second shaft member 5B passes. The circular through hole TH includes a front circular through hole THF and a rear circular through hole THB. In the illustrated example, the front circular through hole THF is configured by a combination of a U-shaped groove DRF that opens upward (in the Z1 direction) and a U-shaped groove URF that opens downward (in the Z2 direction). Specifically, the U-shaped groove DRF and the U-shaped groove URF are disposed adjacent to each other in the front-rear direction (X-axis direction) and disposed facing each other in the upper-lower direction. Similarly, the rear circular through hole THB is configured by a combination of a U-shaped groove DRB that opens upward (in the Z1 direction) and a U-shaped groove URB that opens downward (in the Z2 direction). Specifically, the U-shaped groove DRB and the U-shaped groove URB are disposed adjacent to each other in the front-rear direction (X-axis direction) and disposed facing each other in the upper-lower direction (Z-axis direction).

Further, the second left shaft-receiving portion 32BL has the notch CT through which the first shaft member 5A passes. In the illustrated example, the notch CT is configured by a combination of an upper L-shaped groove UL that opens downward (in the Z2 direction) and to the left (in the Y1 direction) and a lower L-shaped groove DL that opens upward (in the Z1 direction) and to the left (in the Y1 direction). Specifically, the upper L-shaped groove UL and the lower L-shaped groove DL are disposed adjacent to each other in the front-rear direction (X-axis direction) and disposed facing each other in the upper-lower direction (Z-axis direction).

As described, the circular through hole TH is configured by the pair of U-shaped grooves, and the notch CT is configured by the pair of L-shaped grooves. Therefore, the second lens holder 3B can be manufactured by injection molding using a pair of molds separated in the upper-lower direction and not including a slide core. With this configuration, the manufacturing cost can be reduced.

As described above, as illustrated in FIG. 3, the lens holder driving apparatus 101 according to an embodiment of the present invention includes the fixed member FB (base member 2), the lens holder 3 configured to hold the lens body LS, the shaft member 5 that is attached to the fixed member FB (base member 2) and extends along the optical axis direction so as to guide the lens holder 3, and the piezoelectric driver PD that includes the piezoelectric element 8 and is configured to move the lens holder 3 along the optical axis direction by a movement (circular motion) of the piezoelectric element 8. The piezoelectric element 8 extends in a first direction (Z-axis direction) intersecting the optical axis direction. The piezoelectric driver PD is provided on the fixed member FB (base member 2). The receiving member 7 is provided on the lens holder 3, is disposed facing the piezoelectric driver so as to contact the piezoelectric driver, extends in a second direction (X-axis direction) intersecting the first direction in which the piezoelectric element 8 extends, and is configured to receive the movement of the piezoelectric element 8. The piezoelectric driver PD includes the contact member 9 on a surface on the lens holder side of the piezoelectric element 8, and is configured to be preloaded toward the receiving member 7 by the preload member 13 such that the receiving member 7 contacts the contact member 9. The preload member 13 is provided on the fixed member FB (base member 2). In the above-described embodiment, the lens holder driving apparatus 101 is configured to separately move two lens holders 3 (the first lens holder 3A and the second lens holder 3B) along the optical axis direction. However, the lens holder driving apparatus 101 may include one lens holder 3, and may be configured to move the one lens holder 3 along the optical axis direction. Alternatively, the lens holder driving apparatus 101 may be configured to separately move three or more lens holders 3 along the optical axis direction.

With the above configuration, ease of assembly of the lens holder driving apparatus 101 can be facilitated. That is, with the above-described configuration, the lens holder driving apparatus 101 can be more easily assembled. This is because the piezoelectric driver PD is provided on the fixed member FB (base member 2), and power can be supplied to the piezoelectric driver PD without using a member such as a flexible substrate that deforms in accordance with the movement of the lens holder 3. In addition, one effect of the above-described configuration is that the movement of the lens holder 3 is not restricted by a member such as a flexible substrate that deforms in accordance with the movement of the lens holder 3.

Further, in the above-described embodiment, as illustrated in FIG. 4A and the FIG. 4B, the lens holder 3 may include the holding portion 31 configured to hold the lens body LS, and include the shaft-receiving portion 32 configured to receive the shaft member 5. In this case, the receiving member 7 may be composed of a different material from the lens holder 3. In the example illustrated in FIG. 4A and FIG. 4B, the receiving member 7 is formed of a metal, and the lens holder 3 is formed of a synthetic resin. The receiving member 7 is fixed to the shaft-receiving portion 32. The receiving member 7 is longer than the holding portion 31 in the optical axis direction. In addition, the shaft-receiving portion 32 to which the receiving member 7 is fixed is longer than the holding portion 31 in the optical axis direction. Further, the width of the receiving member 7 in the optical axis direction is greater than the width of the movable range of the lens holder 3 in the optical axis direction. In the example illustrated in FIG. 4A, the first lens holder 3A includes the first holding portion 31A configured to hold the first lens body LS1, the first left shaft-receiving portion 32AL configured to receive the first shaft member 5A, and the first right shaft-receiving portion 32AR configured to receive the second shaft member 5B. Further, the second lens holder 3B includes the second holding portion 31B configured to hold the second lens body LS2, the second left shaft-receiving portion 32BL configured to receive the first shaft member 5A, and the second right shaft-receiving portion 32BR configured to receive the second shaft member 5B. The first receiving member 7A is longer than the first holding portion 31A in the optical axis direction. In addition, the first left shaft-receiving portion 32AL to which the first receiving member 7A is fixed is longer than the first holding portion 31A in the optical axis direction. Similarly, the second receiving member 7B is longer than the second holding portion 31B in the optical axis direction. In addition, the second right shaft-receiving portion 32BR to which the second receiving member 7B is fixed is longer than the second holding portion 31B in the optical axis direction. Further, the width W3 of the first receiving member 7A in the optical axis direction is greater than the width of the movable range of the first lens holder 3A in the optical axis direction. The width W7 of the second receiving member 7B in the optical axis direction is greater than the width of the movable range of the second lens holder 3B in the optical axis direction.

One effect of the above-described configuration is that the width of the movable range of the first lens holder 3A in the optical axis direction can be made greater than at least the width of the first holding portion 31A in the optical axis.

In the above-described embodiment, the shaft member 5 includes the first shaft member 5A and the second shaft member 5B. As illustrated in FIG. 7, the receiving member 7 is provided at a position away from a virtual plane VP. Specifically, the first receiving member 7A is provided at a position where its axis 7AX is not located on the virtual plane VP, and the second receiving member 7B is provided at a position where its axis 7BX is not located on the virtual plane VP. In the present embodiment, the axis 7AX and the axis 7BX are configured to be parallel to the virtual plane VP. The virtual plane VP is a virtual plane that includes the axis (axis 5AX) of the first shaft member 5A and the axis (axis 5BX) of the second shaft member 5B, which are parallel to each other. In the example illustrated in FIG. 7, a first movable body, including the first lens holder 3A, the first receiving member 7A, and the first magnetic field generating member MG1, is configured such that its center of gravity is located on the virtual plane VP. With this configuration, it is possible to suppress the generation of a torque around the center of gravity when the first movable body is moved along the shaft member 5. The same applies to a second movable body including the second lens holder 3B, the second receiving member 7B, and the second magnetic field generating member MG2. Specifically, as illustrated in FIG. 3, the base member 2, serving as the fixed side member FB, includes the bottom surface portion 2B. Further, as illustrated in FIG. 4B, the lens holder 3 has an opening at the top thereof, and the lens body LS can be inserted (accommodated) into the lens holder 3 through the opening. As illustrated in FIG. 7, the receiving member 7 is provided at a position offset upward (to the Z1 side) from the virtual plane VP. Note that the receiving member 7 may be provided at a position offset downward (to the Z2 side) from the virtual plane VP.

One effect of the above-described configuration is that backlash of the lens holder 3 can be suppressed. In the example illustrated in FIG. 7, the preload force (preload force F1 indicated by a dotted arrow) of the second preload member 13B that preloads the second receiving member 7B, attached to the second lens holder 3B, toward the Y1 side generates a torque (preload torque TQ indicated by a dash-dot arrow) that rotates the second lens holder 3B around the axis (axis 5BX) of the second shaft member 5B. The preload torque TQ acts so as to press the second left shaft-receiving portion 32BL of the second lens holder 3B against the first shaft member 5A from above. In addition to the preload torque TQ, a torque (a self-weight torque) acts on the second lens holder 3B to rotate the second lens holder 3B around the (axis 5BX) of the second shaft member 5B due to the self-weight of the second lens holder 3B. The second preload member 13B is configured such that the magnitude of the preload torque TQ generated by the preload force F1 is larger than the magnitude of the self-weight torque. Therefore, a combined torque obtained by combining the preload torque TQ and the self-weight torque always acts so as to press the second left shaft-receiving portion 32BL of the second lens holder 3B against the first shaft member 5A, regardless of the orientation of the lens holder driving apparatus 101 (even if the lens holder driving apparatus 101 is turned upside down). That is, not only when the preload torque TQ and the self-weight torque are in the same direction, but also when the preload torque TQ and the self-weight torque are in opposite directions, the combined torque always acts so as to press the second left shaft-receiving portion 32BL of the second lens holder 3B against the first shaft member 5A. As a result, the second left shaft-receiving portion 32BL of the second lens holder 3B always contacts the first shaft member 5A regardless of the orientation of the lens holder driving apparatus 101 (even if the lens holder driving apparatus is turned upside down), thereby suppressing backlash between the second left shaft-receiving portion 32BL and the first shaft member 5A. The same applies to backlash between the second right shaft-receiving portion 32BR of the second lens holder 3B and the second shaft member 5B, backlash between the first right shaft-receiving portion 32AR of the first lens holder 3A and the second shaft member 5B, and backlash between the first left shaft-receiving portion 32AL of the first lens holder 3A and the first shaft member 5A.

Further, one effect of the above-described configuration is that the lens body LS can be easily attached to the lens holder 3 can be obtained. Typically, the lens body LS is attached to the lens holder 3 in a state in which the lower member LM (excluding the lens body LS) is placed on a work table in an orientation as illustrated in FIG. 1B. In this state, the first left shaft-receiving portion 32AL of the first lens holder 3A is pressed against the first shaft member 5A, and the first right shaft-receiving portion 32AR of the first lens holder 3A is pressed against the second shaft member 5B from above. Further, the second right shaft-receiving portion 32BR of the second lens holder 3B is pressed against the second shaft member 5B, and the second left shaft-receiving portion 32BL of the second lens holder 3B is pressed against the first shaft member 5A from above. That is, the position of the lens holder 3 does not change before and after the lens body LS is attached to the lens holder 3.

Further, in the above-described embodiment, each of the receiving member 7 and the contact member 9 is formed of a metal. The receiving member 7 is harder than the contact member 9.

One effect of the above-described configuration is that the receiving member 7 and the contact member 9 are not readily worn, as compared to when at least one of the receiving member 7 and the contact member 9 are formed of a synthetic resin, for example. Further, with the above-described configuration, the contact member 9 is configured to be softer than (readily curved as compared to) the receiving member 7. Therefore, one effect of the above-described configuration is that the flexural vibration (circular motion) of the piezoelectric element 8 can be prevented from being excessively reduced.

Further, in the above-described embodiment, the preload member 13 is a leaf spring member extending in the optical axis direction. Specifically, as illustrated in FIG. 5B, the preload member 13 includes a pair of fixed portions 13F, a support portion 13S, and a pair of elastically deformable portions 13E. The fixed portions 13F are fixed to the base member 2, which serves as the fixed member FB, the support portion 13S supports the piezoelectric driver PD, and each of the elastically deformable portions 13E is elastically deformable and provided between a corresponding fixed portion 13F and the support portion 13S.

One effect of the above-described configuration is that the dimensional tolerance of the preload member 13 can be reduced as compared to a configuration that utilizes a leaf spring member extending in a direction (Z-axis direction) perpendicular to the optical axis direction. This is because the housing HS is configured such that the dimension of the housing HS in the optical axis direction (X-axis direction) is larger than the dimension (height) of the housing HS in the Z-axis direction. That is, the dimension of an elastically deformable portion 13E (the distance between a fixed portion 13F and a support portion 13S) in the optical axis direction can be increased as compared to a configuration that utilizes a leaf spring member extending in a direction (Z-axis direction) perpendicular to the optical axis direction. As the dimension of the elastically deformable portion 13E in the optical axis direction increases, the influence of deviation from the reference dimension of the elastically deformable portion 13E on the spring constant of the elastically deformable portion 13E decreases.

Further, in the above-described embodiment, as illustrated in FIG. 10, the lens holder 3 has a plurality of through holes. The plurality of through holes include the circular through hole RH through which the optical axis OA passes and the circular through hole TH through which the shaft member 5 passes. The circular through hole RH includes the front circular through hole RHF and the rear circular through hole RHB. The circular through hole TH includes the front circular through hole THF and the rear circular through hole THB. Each of the through holes is configured by a combination of a first groove that opens upward and a second groove that opens downward. Specifically, the front circular through hole RHF is configured by a combination of the U-shaped groove DCF that opens upward (in the Z1 direction) and the U-shaped groove UCF that opens downward (in the Z2 direction). The rear circular through hole RHB is configured by a combination of the U-shaped groove DCB that opens upward (in the Z1 direction) and the U-shaped groove UCB that opens downward (in the Z2 direction). The front circular through hole THF is configured by a combination of the U-shaped groove DRF that opens upward (in the Z1 direction) and the U-shaped groove URF that opens downward (in the Z2 direction). The rear circular through hole THB is configured by a combination of the U-shaped groove DRB that opens upward (in the Z1 direction) and the U-shaped groove URB that opens downward (in the Z2 direction). That is, in the above-described embodiment, the lens holder 3 is manufactured by injection molding using a pair of molds separated in the upper-lower direction (Z-axis direction) and not including a slide core.

Accordingly, one effect of the above-described configuration is that the manufacturing cost can be reduced as compared to when the lens holder 3 is manufactured by injection molding using a mold that includes a slide core. This is because, for example, a decrease in manufacturing yield or a decrease in manufacturing efficiency due to mold-related defects can be suppressed.

Further, in the above-described embodiment, as illustrated in FIG. 3, the magnetic field generating member MG is provided on the lens holder 3 and extends in the optical axis direction. As illustrated in FIG. 8A, the magnetic field generating member MG includes a magnet 11 (second magnet 11B), a first magnetic member (second left magnetic member 12BL), and a second magnetic member (second right magnetic member 12BR). The magnet 11 is magnetized such that first end portion (an end portion on the Y1 side (a left end portion)), in a third direction (Y-axis direction) perpendicular to the optical axis direction, of the magnet 11 becomes a S-pole and a second end portion (an end portion on the Y2 side (a right end portion)) of the magnet 11 becomes an N-pole. The first magnetic member (second left magnetic member 12BL) is fixed to the first end portion of the magnet, and the second magnetic member (second right magnetic member 12BR) is fixed to the second end portion of the magnet. The first magnetic member (second left magnetic member 12BL) has a plurality of first protruding portions (first to third left protruding portions PR1L to PR3L) that protrude toward the second end portion of the magnet 11. The second magnetic member (second right magnetic member 12BR) has a plurality of second protruding portions (first to third right protruding portions PR1R to PR3R) that protrude toward the first end portion of the magnet 11. The first protruding portions (first to third left protruding portions PR1L to PR3L) and the second protruding portions (first to third right protruding portions PR1R to PR3R) protrude in opposite directions, and are alternately arranged in the optical axis direction (X-axis direction) in which the magnetic field generating member MG extends. In the illustrated example, the first magnetic member (second left magnetic member 12BL) has the plurality of first protruding portion (first to third left protruding portions PR1L to PR3L) that protrude in the first direction (Z-axis direction) perpendicular to the optical axis direction and perpendicular to the third direction (Y-axis direction). The second magnetic member (second right magnetic member 12BR) has the plurality of second protruding portion (first to third right protruding portions PR1R to PR3R) that protrude in the first direction (Z-axis direction). The first protruding portions (first to third left protruding portions PR1L to PR3L) and the second protruding portions (first to third right protruding portions PR1R to PR3R) protrude in the opposite directions, and are alternately arranged in the optical axis direction (X-axis direction) in which the magnetic field generating member MG extends. The magnetic sensor 6 is provided on the base member 2 (substrate 4), which serves as the fixed member FB, and is configured to detect a magnetic field generated by each of the first protruding portion (first to third left protruding portions PR1L to PR3L) and of the second protruding portions (first to third right protruding portions PR1R to PR3R).

This configuration has the effect that the manufacturing cost of the lens holder driving apparatus 101 can be reduced. This is because the movement of the lens holder 3 in the optical axis direction can be detected by using the magnetic field generating member MG configured by a combination of the magnetic member 12 and the magnet 11 magnetized to two poles, without using a permanent magnet magnetized to multiple poles.

Further, in the above-described embodiment, as illustrated in FIG. 1B, the lens body LS includes the first lens body LS1 and the second lens body LS2. The first lens body LS1 and the second lens body LS2 have the common optical axis OA. As illustrated in FIG. 3, the lens holder 3 includes the first lens holder 3A and the second lens holder 3B. The first lens holder 3A is configured to hold the first lens body LS1, and the second lens holder is configured to hold the second lens body LS2. The shaft member 5 includes the first shaft member 5A and the second shaft member 5B. The piezoelectric driver PD includes the first piezoelectric driver PD1 and the second piezoelectric driver PD2. The first piezoelectric driver PD1 includes the first piezoelectric element 8A and is configured to move the first lens holder 3A along the optical axis direction by a movement (circular motion) of the first piezoelectric element 8A, and the second piezoelectric driver PD2 includes the second piezoelectric element 8B and is configured to move the second lens holder 3B along the optical axis direction by a movement (circular motion) of the second piezoelectric element 8B. The first piezoelectric element 8A and the second piezoelectric element 8B extend in the first direction (Z-axis direction) intersecting the optical axis direction. The first lens holder 3A and the second lens holder 3B are disposed facing each other in the optical axis direction. The first piezoelectric driver PD1 and the second piezoelectric driver PD2 are both provided on the base member 2, which serves as the fixed member FB. The first piezoelectric driver PD1 and the second piezoelectric driver PD2 are apart from each other, with the first shaft member 5A and the second shaft member 5B interposed therebetween. Specifically, as illustrated in FIG. 3, the first receiving member 7A is provided on the first lens holder 3A, is disposed facing the first piezoelectric driver PD1 so as to contact the first piezoelectric driver PD1, extends in the X-axis direction intersecting the first direction (Z-axis direction) in which the first piezoelectric element 8A extends, and is configured to receive the movement of the first piezoelectric element 8A. As illustrated in FIG. 4A, the first lens holder 3A includes a first portion (first left shaft-receiving portion 32AL) located near the first shaft member 5A and a second portion (first right shaft-receiving portion 32AR) located near the second shaft member 5B. The first receiving member 7A is provided on the first portion (first left shaft-receiving portion 32AL), located near the first shaft member 5A, of the first lens holder 3A. Similarly, as illustrated in FIG. 3, the second receiving member 7B is provided on the second lens holder 3B, is disposed facing the second piezoelectric driver PD2 so as to contact the second piezoelectric driver PD2, extends in the X-axis direction intersecting the first direction (Z-axis direction) in which the second piezoelectric element 8B extends, and is configured to receive the movement of the second piezoelectric element 8B. As illustrated in FIG. 4A, the second lens holder 3B includes a third portion (second left shaft-receiving portion 32BL) located near the first shaft member 5A and a fourth portion (second right shaft-receiving portion 32BR) located near the second shaft member 5B. The second receiving member 7B is provided on the fourth portion (second right shaft-receiving portion 32BR), located near the second shaft member 5B, of the second lens holder 3B. The first piezoelectric driver PD1 includes the first contact member 9A on a surface on the first lens holder 3A side (Y2 side) of the first piezoelectric element 8A, and is configured to be preloaded toward the first receiving member 7A (Y2 side) by the first preload member 13A such that the first receiving member 7A contacts the first contact member 9A. The first preload member 13A is provided on the base member 2, which serves as the fixed member FB. Similarly, the second piezoelectric driver PD2 includes the second contact member 9B on a surface on the second lens holder 3B side (Y1 side) of the second piezoelectric element 8B, and is configured to be preloaded toward the second receiving member 7B (Y1 side) by the second preload member 13B such that the second receiving member 7B contacts the second contact member 9B. The second preload member 13B is provided on the base member 2, which serves as the fixed member FB.

One effect of the above-described configuration is that ease of assembly of the lens holder driving apparatus 101 can be facilitated. That is, with the above-described configuration, the lens holder driving apparatus 101 can be more easily assembled. This is because the first piezoelectric driver PD1 is provided on the fixed member FB (base member 2), and power can be supplied to the first piezoelectric driver PD1 without using a member such as a flexible substrate that deforms in accordance with the movement of the first lens holder 3A. Similarly, this is because the second piezoelectric driver PD2 is provided on the fixed member FB (base member 2), and power can be supplied to the second piezoelectric driver PD2 without using a member such as a flexible substrate that deforms in accordance with the movement of the first lens holder 3A. Further, one effect of the above-described configuration is that the movement of the first lens holder 3A is not restricted by a member such as a flexible substrate that deforms in accordance with the movement of the first lens holder 3A. In addition, one effect of the above-described configuration is that the movement of the second lens holder 3B is not restricted by a member such as a flexible substrate that deforms in accordance with the movement of the second lens holder 3B.

Further, with the above-described configuration, the first piezoelectric driver PD1 and the second piezoelectric driver PD2 are provided on the fixed member FB (base member 2) at positions away from each other. Accordingly, easy of assembly can be facilitated.

In the above-described embodiment, as illustrated in FIG. 4A, the first lens holder 3A includes the first holding portion 31A that holds the first lens body LS1. The first receiving member 7A is longer than the first holding portion 31A in the optical axis direction. Similarly, as illustrated in FIG. 4A, the second lens holder 3B includes the second holding portion 31B configured to hold the second lens body LS2. The second receiving member 7B is longer than the second holding portion 31B in the optical axis direction. At least a part of the first receiving member 7A and at least a part of the second receiving member 7B overlap in the third direction (Y-axis direction) perpendicular to the optical axis direction in a state in which the first holding portion 31A and the second holding portion 31B are in proximity to each other. In the state illustrated in FIG. 4A, the first receiving member 7A and the second receiving member 7B overlap over the width W9 in the third direction (Y-axis direction) perpendicular to the optical axis direction.

One effect of the above-described configuration is that the amount of movement of each of the first lens holder 3A and the second lens holder 3B in the optical axis direction can be increased within the limited length of the shaft member 5 in the optical axis direction. While the width W1 of the first left shaft-receiving portion 32AL is set to be greater than the width W2 of the first holding portion 31A, and the width W5 of the second right shaft-receiving portion 32BR is set to be greater than the width W6 of the second holding portion 31B, the first lens body LS1 and the second lens body LS2 can approach each other to the extent that the first lens body LS1 and the second lens body LS2 are nearly in contact with each other.

As illustrated in FIG. 7, each of the first receiving member 7A and the second receiving member 7B may be provided at a position away from the virtual plane VP that includes the axis of the first shaft member 5A and the axis of the second shaft member 5B.

One effect of the above-described configuration is that backlash of each of the first lens holder 3A and the second lens holder 3B can be suppressed. This is because the lens holder driving apparatus 101 can have a configuration in which a torque acting on the first lens holder 3A always acts so as to press the first lens holder 3A against the shaft member 5, and a torque actin on the second lens holder 3B always acts so as to press the second lens holder 3B against the shaft member 5, regardless of the orientation of the lens holder driving apparatus 101 (even if the lens holder driving apparatus 101 is turned upside down).

In the above-described embodiment, as illustrated in FIG. 3, the base member 2, serving as the fixed member FB, includes the bottom surface portion 2B. Further, the first lens holder 3A has an opening at the top thereof, and the first lens body LS1 can be inserted into the first lens holder 3A through the opening. As illustrated in FIG. 7, the first receiving member 7A is located above (on the Z1 side relative to) the virtual plane VP. Similarly, as illustrated in FIG. 4B, the second lens holder 3B has an opening at the top thereof, and the second lens body LS2 can be inserted into the second lens holder 3B through the opening. As illustrated in FIG. 7, the second receiving member 7B is located above (on the Z1 side relative to) the virtual plane VP.

One effect of the above-described configuration is that the first lens body LS1 can be easily attached to the first lens holder 3A. This is because the first left shaft-receiving portion 32AL of the first lens holder 3A is pressed against the first shaft member 5A, and the first right shaft-receiving portion 32AR of the first lens holder 3A is pressed against the second shaft member 5B from above. That is, the lens holder driving apparatus 101 is configured to prevent backlash between the first lens holder 3A and each of the first shaft member 5A and the second shaft member 5B before and after the first lens body LS1 is attached to the first lens holder 3A. The same applies to a case where the second lens body LS2 is attached to the second lens holder 3B.

In the above-described embodiment, the first preload member 13A is a leaf spring member. As illustrated in FIG. 5B, the first preload member 13A includes a pair of first fixed portions (fixed portions 13F), a first support portion (support portion 13S), and a pair of first elastically deformable portions (elastically deformable portions 13E). The first fixed portions (fixed portions 13F) are fixed to the base member 2, which serves as the fixed member FB, the first support portion (support portion 13S) supports the first piezoelectric driver PD1, and each of the first elastically deformable portions (elastically deformable portions 13E) is elastically deformable and provided between a corresponding first fixed portion (fixed portion 13F) and the first support portion (support portion 13S). Similarly, the second preload member 13B is a leaf spring member. The second preload member 13B includes a pair of second fixed portions (fixed portions 13F), a second support portion (support portion 13S), and a pair of second elastically deformable portions (elastically deformable portions 13E). The second fixed portions (fixed portions 13F) are fixed to the base member 2, which serves as the fixed member FB, the second support portion (support portion 13S) supports the second piezoelectric driver PD2, and each of the second elastically deformable portions (elastically deformable portions 13E) is elastically deformable and provided between a corresponding second fixed portion (fixed portion 13F) and the second support portion (support portion 13S).

One effect of the above-described configuration is that the dimensional tolerance of each of the first preload member 13A and the second preload member 13B can be reduced as compared to a configuration that utilizes a leaf spring member extending in a direction (Z-axis direction) perpendicular to the optical axis direction. This is because the housing HS is configured to have a larger dimension in the optical axis direction (X-axis direction) than a dimension (height) in the Z-axis direction. That is, with the above-described configuration, the dimension of an elastically deformable portion 13E in the optical axis direction (the distance between a fixed portion 13F and a support portion 13S) can be increased as compared to a configuration that utilizes a leaf spring member extending in a direction (Z-axis direction) perpendicular to the optical axis direction. As the dimension of the elastically deformable portion 13E in the optical axis direction increases, the influence of deviation from the reference dimension of the elastically deformable portion 13E on the spring constant of the elastically deformable portion 13E decreases.

In the above-described embodiment, the first magnetic field generating member MG1 is provided on the first shaft member 5A side of the first lens holder 3A, and extends in the optical axis direction. The second magnetic field generating member MG2 is provided on the second shaft member 5B side of the second lens holder 3B, and extends in the optical axis direction. The first magnetic sensor 6A is provided on the base member 2 (substrate 4), which serves as the fixed member FB, and is configured to detect a magnetic field generated by the first magnetic field generating member MG1. The second magnetic sensor 6B is provided on the base member 2 (substrate 4), and is configured to detect a magnetic field generated by the second magnetic field generating member MG2.

One effect of the above-described configuration is that magnetic mutual interference between the first position detection mechanism DT1, configured by the first magnetic field generating member MG1 and the first magnetic sensor 6A, and the second position detection mechanism DT2, configured by the second magnetic field generating member MG2 and the second magnetic sensor 6B, can be suppressed.

According to an embodiment of the present invention, a lens holder driving apparatus that can be easily assembled is provided.

The embodiment of the present invention has been described in detail above. However, the present invention is not limited to the particulars of the above-described embodiment. Various modifications and substitutions may be applied to the above-described embodiment without departing from the scope of the present invention. Furthermore, the separately described features may be suitably combined as long as no technical contradiction occurs.

For example, in the above-described embodiment, the circular through hole TH is configured by a combination of two U-shaped grooves. However, one or both of the U-shaped grooves may be V-shaped grooves. The same applies to the circular through hole RH.

What is claimed is:
1. A lens holder driving apparatus comprising:
a fixed member;
a lens holder configured to hold a lens body;
a shaft member that is provided on the fixed member and extends along an optical axis direction so as to guide the lens holder;
a piezoelectric driver that includes a piezoelectric element and is configured to move the lens holder along the optical axis direction by a movement of the piezoelectric element, the piezoelectric element extending in a first direction intersecting the optical axis direction;
a receiving member that is provided on the lens holder; and
a preload member that is provided on the fixed member;
wherein the piezoelectric driver is provided on the fixed member,
wherein the receiving member is disposed facing the piezoelectric driver so as to contact the piezoelectric driver, extends in a second direction intersecting the first direction in which the piezoelectric element extends, and is configured to receive the movement of the piezoelectric element,
wherein the piezoelectric element is configured to generate a circular motion about a rotation axis parallel to the direction in which the piezoelectric element extends, and the receiving member is moved forward and rearward in the optical axis direction by the circular motion, and wherein the piezoelectric driver includes a contact member on a surface on a lens holder side of the piezoelectric element, and is configured to be preloaded toward the receiving member by the preload member such that the receiving member contacts the contact member.

2. The lens holder driving apparatus according to claim 1, wherein the lens holder includes a holding portion configured to hold the lens body, and includes a shaft-receiving portion configured to receive the shaft member, the receiving member is composed of a different material from the lens holder, fixed to the shaft-receiving portion, and longer than the holding portion in the optical axis direction, and the shaft-receiving portion is longer than the holding portion in the optical axis direction.

3. The lens holder driving apparatus according to claim 1, wherein the shaft member includes a first shaft member and a second shaft member, and the receiving member is provided at a position away from a virtual plane that includes an axis of the first shaft member and an axis of the second shaft member.

4. The lens holder driving apparatus according to claim 3, wherein the fixed member includes a bottom surface portion, the lens holder has an opening at a top thereof, and the lens body is inserted into the lens holder through the opening, and the receiving member is located above the virtual plane.

5. The lens holder driving apparatus according to claim 1, wherein each of the receiving member and the contact member is formed of a metal, and the receiving member is harder than the contact member.

6. The lens holder driving apparatus according to claim 1, wherein the preload member is a leaf spring member extending in the optical axis direction, and includes a pair of fixed portions, a support portion, and a pair of elastically deformable portions, the pair of fixed portions being fixed to the fixed member, the support portion supporting the piezoelectric driver, and each of the elastically deformable portions being elastically deformable and provided between a corresponding fixed portion and the support portion.

7. The lens holder driving apparatus according to claim 1, wherein the lens holder has a plurality of through holes in the optical axis direction, and each of the through holes is configured by a combination of a first groove that opens upward and a second groove that opens downward.

8. The lens holder driving apparatus according to claim 1, further comprising a magnetic field generating member and a magnetic sensor, wherein the magnetic field generating member is provided on the lens holder and extends in the optical axis direction, the magnetic field generating member includes a magnet, a first magnetic member, and a second magnetic member, the magnet being magnetized such that a first end portion, in a third direction perpendicular to the optical axis direction, of the magnet becomes a S-pole and a second end portion of the magnet becomes an N-pole, the first magnetic member being fixed to the first end portion of the magnet, and the second magnetic member being fixed to the second end portion of the magnet, the first magnetic member has a plurality of first protruding portions that protrude toward the second end portion of the magnet, the second magnetic member has a plurality of second protruding portions that protrude toward the first end portion of the magnet, the first protruding portions and the second protruding portions protrude in opposite directions, and are alternately arranged in the optical axis direction in which the magnetic field generating member extends, and the magnetic sensor is provided on the fixed member, and is configured to detect a magnetic field generated by each of the first protruding portions and the second protruding portions.

9. The lens holder driving apparatus according to claim 1, wherein the lens body includes a first lens body and a second lens body, the first lens body and the second lens body having a common optical axis, the lens holder includes a first lens holder and a second lens holder, the first lens holder being configured to hold the first lens body, and the second lens holder being configured to hold the second lens body, the shaft member includes a first shaft member and a second shaft member, the piezoelectric driver includes a first piezoelectric driver and a second piezoelectric driver, the first piezoelectric driver including a first piezoelectric element and being configured to move the first lens holder along the optical axis direction by a movement of the first piezoelectric element, and the second piezoelectric driver including a second piezoelectric element and being configured to move the second lens holder along the optical axis direction by a movement of the second piezoelectric element, the first piezoelectric element and the second piezoelectric element extending in the first direction intersecting the optical axis direction, the first lens holder and the second lens holder are disposed facing each other in the optical axis direction, the first piezoelectric driver and the second piezoelectric driver are both provided on the fixed member, the receiving member includes a first receiving member and a second receiving member, the first receiving member being provided on the first lens holder and the second receiving member being provided on the second lens holder, the first receiving member
is disposed facing the first piezoelectric driver so as to contact the first piezoelectric driver,
extends in the second direction intersecting the first direction in which the first piezoelectric element extends, and
is configured to receive the movement of the first piezoelectric element, the first lens holder includes a first portion located near the first shaft member and a second portion located near the second shaft member, the first receiving member is provided on the first portion, located near the first shaft member, of the first lens holder, the second receiving member
is disposed facing the second piezoelectric driver so as to contact the second piezoelectric driver,
extends in the second direction intersecting the first direction in which the second piezoelectric element extends, and
is configured to receive the movement of the second piezoelectric element, the second lens holder includes a third portion located near the first shaft member and a fourth portion located near the second shaft member, the second receiving member is provided on the fourth portion, located near the second shaft member, of the second lens holder, the preload member includes a first preload member and a second preload member, the first preload member and the second preload member being provided on the fixed member, the first piezoelectric driver includes a first contact member on a surface, on a first lens holder side of the first piezoelectric element, and is configured to be preloaded toward the first receiving member by the first preload member, such that the first receiving member contacts the first contact member, and the second piezoelectric driver includes a second contact member on a surface, on a second lens holder side of the second piezoelectric element, and is configured to be preloaded toward the second receiving member by the second preload member, such that the second receiving member contacts the second contact member.

10. The lens holder driving apparatus according to claim 9, wherein the first lens holder includes a first holding portion configured to hold the first lens body, the first receiving member is longer than the first holding portion in the optical axis direction, the second lens holder includes a second holding portion configured to hold the second lens body, the second receiving member is longer than the second holding portion in the optical axis direction, and at least a part of the first receiving member and at least a part of the second receiving member overlap in a third direction perpendicular to the optical axis direction in a state in which the first holding portion and the second holding portion are in proximity to each other.

11. The lens holder driving apparatus according to claim 9, wherein each of the first receiving member and the second receiving member is provided at a position away from a virtual plane that includes an axis of the first shaft member and an axis of the second shaft member.

12. The lens holder driving apparatus according to claim 11, wherein the fixed member includes a bottom surface portion, the first lens holder has a first opening at a top thereof, and the first lens body is inserted into the first lens holder through the first opening, the first receiving member is located above the virtual plane, the second lens holder has a second opening at a top thereof, and the second lens body is inserted into the second lens holder through the second opening, and the second receiving member is located above the virtual plane.

13. The lens holder driving apparatus according to claim 9, wherein the first preload member is a leaf spring member extending in the optical axis direction, and includes a pair of first fixed portions, a first support portion, and a pair of first elastically deformable portions, the first fixed portions being fixed to the fixed member, the first support portion supporting the first piezoelectric driver, and each of the first elastically deformable portions being elastically deformable and provided between a corresponding first fixed portion and the first support portion, and wherein the second preload member is a leaf spring member extending in the optical axis direction, and includes a pair of second fixed portions, a second support portion, and a pair of second elastically deformable portions, the second fixed portions being fixed to the fixed member, the second support portion supporting the second piezoelectric driver, and each of the second elastically deformable portions being elastically deformable and provided between a corresponding second fixed portion and the second support portion.

14. The lens holder driving apparatus according to claim 9, further comprising a first magnetic field generating member, a second magnetic field generating member, a first magnetic sensor, and a second magnetic sensor, wherein the first magnetic field generating member is provided on a first shaft member side of the first lens holder and extends in the optical axis direction, the second magnetic field generating member is provided on a second shaft member side of the second lens holder and extends in the optical axis direction, the first magnetic sensor is provided on the fixed member and is configured to detect a magnetic field generated by the first magnetic field generating member, and the second magnetic sensor is provided on the fixed member and is configured to detect a magnetic field generated by the second magnetic field generating member.

15. The lens holder driving apparatus according to claim 1, wherein the piezoelectric element has a two-layer structure including a first layer configured to generate a first flexural vibration in a first plane and a second layer configured to generate a second flexural vibration in a second plane, said first plane being perpendicular to the second plane, and the piezoelectric element is configured to generate the circular motion by combining the first flexural vibration and the second flexural vibration.

* * * * *